US011009774B2

(12) United States Patent
Ito

(10) Patent No.: US 11,009,774 B2
(45) Date of Patent: May 18, 2021

(54) FOCUS ADJUSTMENT DEVICE AND FOCUS ADJUSTMENT METHOD

(71) Applicant: Olympus Corporation, Hachioji (JP)

(72) Inventor: Satoru Ito, Komae (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/903,079

(22) Filed: Jun. 16, 2020

(65) Prior Publication Data

US 2020/0409239 A1    Dec. 31, 2020

(30) Foreign Application Priority Data

Jun. 25, 2019    (JP) .............................. JP2019-117592

(51) Int. Cl.
 *G03B 13/36* (2021.01)
 *H04N 5/235* (2006.01)
 *H04N 5/232* (2006.01)

(52) U.S. Cl.
 CPC ........... *G03B 13/36* (2013.01); *H04N 5/2351* (2013.01); *H04N 5/232121* (2018.08)

(58) Field of Classification Search
 CPC ................. G03B 13/36; H04N 5/2351; H04N 5/232121; H04N 5/232123
 See application file for complete search history.

(56) References Cited

U.S. PATENT DOCUMENTS

| | | | |
|---|---|---|---|
| 2002/0154909 A1 | 10/2002 | Yamazaki et al. | |
| 2007/0212049 A1* | 9/2007 | Guroglu | H04N 5/232123 396/127 |
| 2016/0234424 A1* | 8/2016 | Ito | H04N 5/23212 |
| 2016/0373642 A1* | 12/2016 | Ito | H04N 5/23212 |
| 2017/0054893 A1* | 2/2017 | Kudo | H04N 5/232122 |
| 2017/0236317 A1* | 8/2017 | Yachi | A61B 1/00009 348/68 |
| 2017/0347017 A1* | 11/2017 | Ito | G02B 7/09 |
| 2018/0152620 A1* | 5/2018 | Ito | H04N 5/23209 |
| 2018/0316870 A1* | 11/2018 | Yoshino | A61B 1/00009 |
| 2018/0316871 A1* | 11/2018 | Yoshino | H04N 5/232123 |
| 2019/0238756 A1* | 8/2019 | Tokioka | H04N 5/238 |
| 2019/0387175 A1* | 12/2019 | Kikuchi | H04N 5/23245 |
| 2020/0029011 A1* | 1/2020 | Takahashi | H04N 5/23212 |

* cited by examiner

*Primary Examiner* — Shahbaz Nazrul
(74) *Attorney, Agent, or Firm* — John C. Pokotylo; Pokotylo Patent Services

(57) ABSTRACT

A focus adjustment device, comprising a focus detection section that, if, at the time of correction of an evaluation value by a correction section, it is determined that the corrected evaluation value is smaller than a specified threshold value, makes a determination threshold value for detection of a focus position at which the evaluation value exhibits an extreme value, stricter than for a case when it is determined that the corrected evaluation value is greater than the specified threshold value.

20 Claims, 14 Drawing Sheets

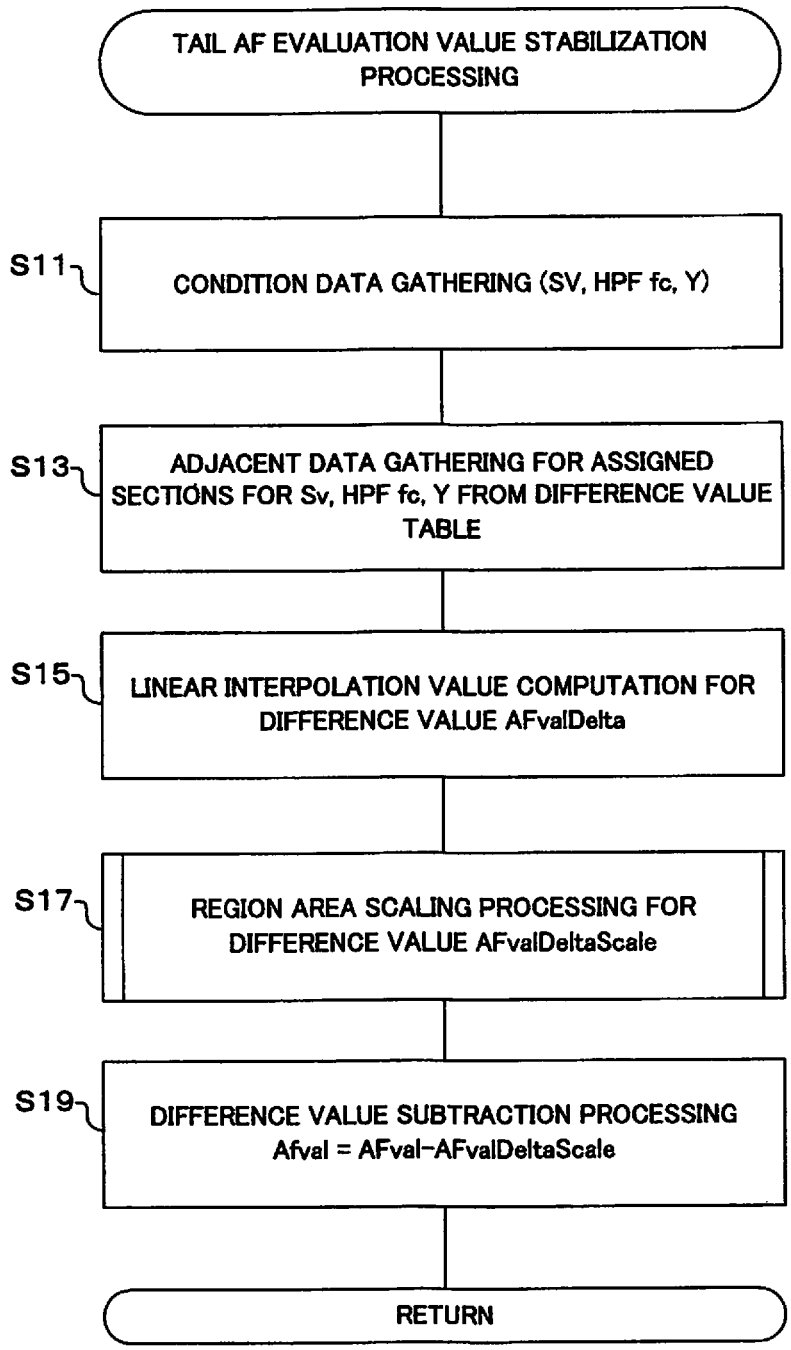

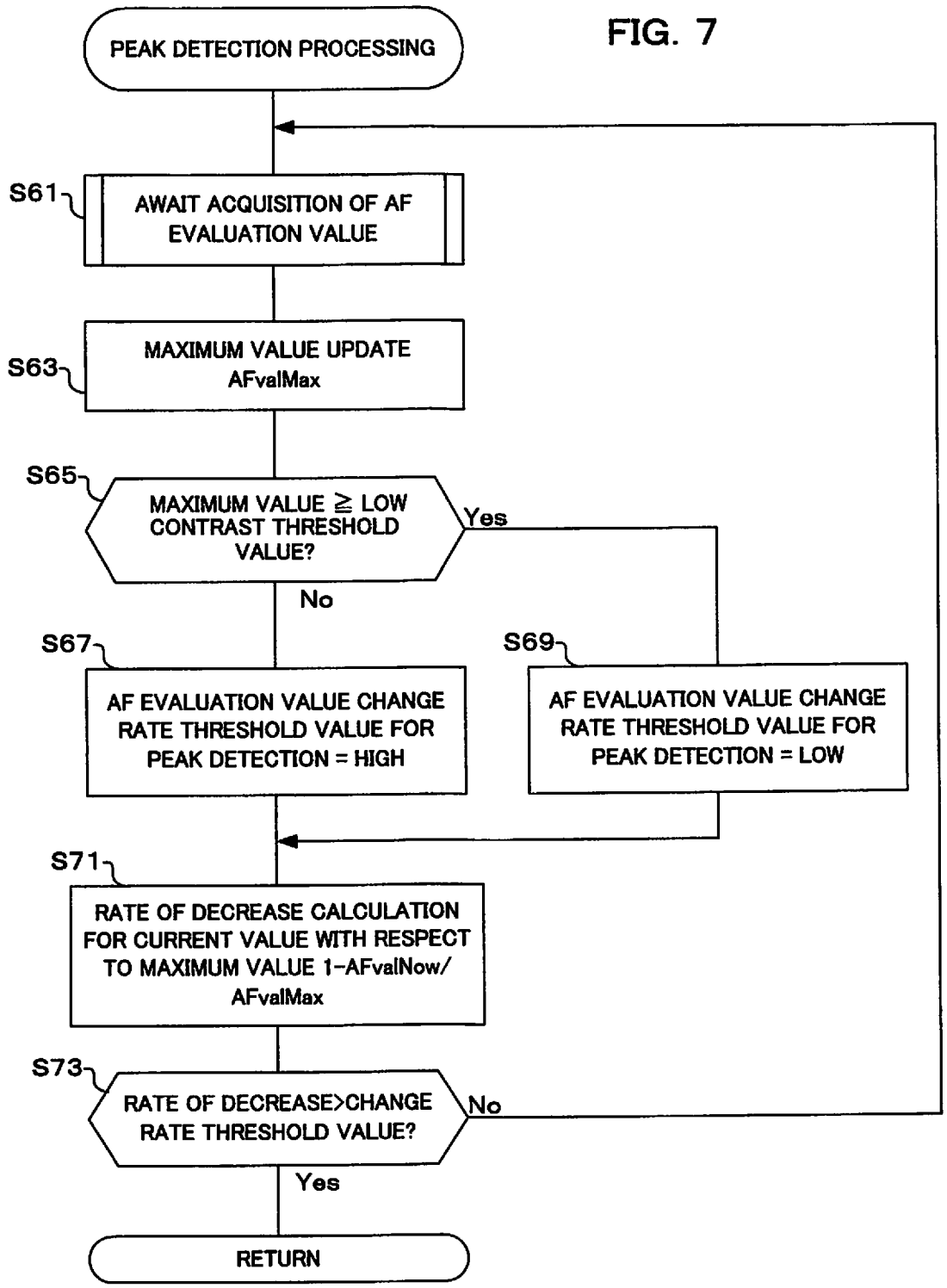

| Y SECTION 1 START POINT | | Sv SECTION START POINT | | | |
|---|---|---|---|---|---|
| | | SECTION 1 | SECTION 2 | ... | SECTION 6 |
| HPF fc SECTION START POINT | SECTION 1 | 20 | 100 | ... | 10000 |
| | SECTION 2 | 25 | 125 | ... | 14000 |
| | ... | ... | ... | ... | ... |
| | SECTION 6 | 50 | 250 | ... | 28000 |

GR2

| Y SECTION 2 START POINT | | Sv SECTION START POINT | | | |
|---|---|---|---|---|---|
| | | SECTION 1 | SECTION 2 | ... | SECTION 6 |
| HPF fc SECTION START POINT | SECTION 1 | 80 | 400 | ... | 40000 |
| | SECTION 2 | 100 | 500 | ... | 56000 |
| | ... | ... | ... | ... | ... |
| | SECTION 6 | 200 | 1000 | ... | 112000 |

......

GR6

| Y SECTION 6 START POINT | | Sv SECTION START POINT | | | |
|---|---|---|---|---|---|
| | | SECTION 1 | SECTION 2 | ... | SECTION 6 |
| HPF fc SECTION START POINT | SECTION 1 | 320 | 1600 | ... | 160000 |
| | SECTION 2 | 400 | 2000 | ... | 224000 |
| | ... | ... | ... | ... | ... |
| | SECTION 6 | 800 | 4000 | ... | 448000 |

FOCUS ADJUSTMENT DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2019-117592 filed on Jun. 25, 2019. This application is expressly incorporated herein by reference. The scope of the present invention is not limited to any requirements of the specific embodiments described in the application.

BACKGROUND OF THE INVENTION

1. Field of the Invention

The present invention relates to a focus adjustment device and a focus adjustment method that calculate an AF evaluation value based on an image signal that has been output from an image sensor, and perform focus adjustment of a focus lens based on this AF evaluation value.

2. Description of the Related Art

Conventionally, focus adjustment used contrast AF. This contrast AF calculates AF evaluation value based on an image signal that is output from an image sensor while moving a focus lens, and makes a position of the focus lens at which this AF evaluation value becomes a peak an in-focus position. At tail portions of an AF evaluation value curve (also called "contrast curve"), the evaluation value fluctuates due to noise, and so there may be erroneous determination that there is a peak despite there being no true in-focus position. In order to prevent this false focus, with a focus adjustment device disclosed in Japanese patent laid-open No. Hei 6-339059 (hereafter referred to as "patent publication 1") a low contrast threshold value (absolute value) is provided, and if an AF evaluation value is smaller than this low contrast threshold value peak detection and direction determination (wobbling) are not executed.

Absolute value of AF evaluation value varies in accordance with conditions such as imaging sensitivity, HPF cut-off frequency, brightness level, imaging drive mode etc. This means that regardless of there being differences in the above described conditions, there is a risk of erroneous determination if whether or not there is low contrast is determined by comparing AF evaluation value with a single low contrast threshold value. For example, if a low contrast threshold value LlowconTh-prior is set so as to become optimal for a medium imaging sensitivity within a range of imaging sensitivity that can be set, as shown in FIG. 15, then in a state where imaging sensitivity is low an AF evaluation value Llow-prior is likely to become lower than low contrast threshold value LlowconTh-prior, and it becomes easy to determine that AF is impossible. Conversely, in a state where imaging sensitivity is higher a noise component of an AF evaluation value Lhigh-prior is increased as a result of increase in imaging noise, and since the tail portions of the graph are raised up it becomes easy for false focus to arise with a low contrast threshold value.

SUMMARY OF THE INVENTION

The present invention provides a focus adjustment device and a focus adjustment method that can move a focus lens to a correct in-focus position, at the time of focus adjustment using AF evaluation value, even if there is change in condition data, such as imaging sensitivity, HPF cut-off frequency, brightness level, imaging drive mode etc.

A focus adjustment device of a first aspect of the present invention comprises an image sensor that subjects subject light that has passed through an photographing optical system to photoelectric conversion and outputs an image signal, and a processor that comprises an evaluation value calculation section, a correction section and a focus detection section, wherein the evaluation value calculation section calculates an evaluation value that represents contrast, based on the image signal output by the image sensor, the correction section corrects the evaluation value or a specified threshold value in accordance with conditions at the time of acquiring the evaluation value, and the focus detection section detects position of a focus lens at which the evaluation value exhibits an extreme value, based on the evaluation value that has been calculated by the evaluation value calculation section or an evaluation value that has been corrected by the correction section, and wherein the focus detection section, if, at the time of correction of the evaluation value by the correction section, it is determined that the corrected evaluation value is smaller than the specified threshold value, makes a determination threshold value for detection of a focus position at which the corrected evaluation value exhibits an extreme value, stricter than for a case when it is determined that the corrected evaluation value is greater than the specified threshold value, or the focus detection section, if, at the time of correction of the specified threshold value by the correction section, it is determined that the evaluation value is smaller than threshold value that has been corrected by the correction section, makes a determination threshold value for detection of a focus position at which the evaluation value exhibits an extreme value, stricter than for a case when it is determined that the evaluation value is greater than the corrected threshold value.

A focus adjustment method of a second aspect of the present invention comprises subjecting subject light that has passed through a photographing optical system to photoelectric conversion using an image sensor and outputting an image signal, calculating an evaluation value that represents contrast based on the image signal, correcting the evaluation value or a specified threshold value in accordance with conditions at the time of acquiring the evaluation value, detecting position of the focus lens where the evaluation value exhibits an extreme value based on the evaluation value or the corrected evaluation value, if, at the time of correction of the evaluation value, it is determined that the corrected evaluation value is smaller than the specified threshold value, making a determination threshold value for detection of a focus position at which the corrected evaluation value exhibits an extreme value, stricter than for a case when it is determined that the corrected evaluation value is greater than the specified threshold value, or if, at the time of correction of the specified threshold value, it is determined that the evaluation value is smaller than the corrected threshold value, makes a determination threshold value for detection of a focus position at which the evaluation value exhibits an extreme value, stricter than for a case when it is determined that the evaluation value is greater than the corrected threshold value.

A non-transitory computer-readable medium of a third aspect of the present invention, storing a processor executable code, which when executed by at least one processor, performs a focus adjustment method, the focus adjustment method comprising subjecting subject light that has passed through an photographing optical system to photoelectric conversion using an image sensor and outputting an image signal, calculating an evaluation value that represents contrast based on the image signal, correcting the evaluation value or a specified threshold value in accordance with conditions at the time of acquiring the evaluation value, detecting position of the focus lens where the evaluation value exhibits an extreme value based on the evaluation value or the corrected evaluation value, if, at the time of correction of the evaluation value, it is determined that the corrected evaluation value is smaller than the specified threshold value, making a determination threshold value for detection of a focus position at which the corrected evaluation value exhibits an extreme value, stricter than for a case when it is determined that the corrected evaluation value is greater than the specified threshold value, or if, at the time of correction of the specified threshold value, it is determined that the evaluation value is smaller than the corrected threshold value, makes a determination threshold value for detection of a focus position at which the evaluation value exhibits an extreme value, stricter than for a case when it is determined that the evaluation value is greater than the corrected threshold value.

BRIEF DESCRIPTION OF THE DRAWINGS

FIG. 3 is a flowchart showing tail AF evaluation value stabilization processing of the camera of the first embodiment of the present invention.

FIG. 7 is a flowchart showing peak detection processing of the camera of the first embodiment of the present invention.

FIG. 8 is a table showing stored content of a difference value table, in the camera of the first embodiment of the present invention.

DETAILED DESCRIPTION OF THE PREFERRED EMBODIMENTS

An example where a digital camera (hereafter simply called "camera") is adopted as a focus adjustment device of a preferred embodiment of the present invention will be described in the following. This camera has an imaging section, with a subject image being converted to image data by this imaging section, and the subject image being subjected to live view display on a display section arranged on the rear surface etc. of the camera body based on this converted image data. A photographer determines composition and photo opportunity by looking at the live view display. If the photographer operates a release, image data is stored in a storage medium. Image data that has been stored in the storage medium can be subjected to playback display on the display section if the photographer selects playback mode.

Also, this camera performs focus adjustment of a focus lens using contrast AF. Memory within the camera previously stores difference values between respectively appropriate threshold values corresponding to some or all combinations of conditions such as imaging sensitivity, HPF cut-off frequency, brightness level, imaging drive mode etc., and AF evaluation values of tail regions. At the time of performing focus adjustment, difference values in accordance with condition data, such as imaging sensitivity, HPF cut-off frequency, brightness level, imaging drive mode, etc. are read out from memory, a difference value is subtracted from (or added to) an AF evaluation value that have been detected to calculate low contrast threshold value, and focus adjustment is performed by means of contrast AF using this low contrast threshold value.

Figure 1:
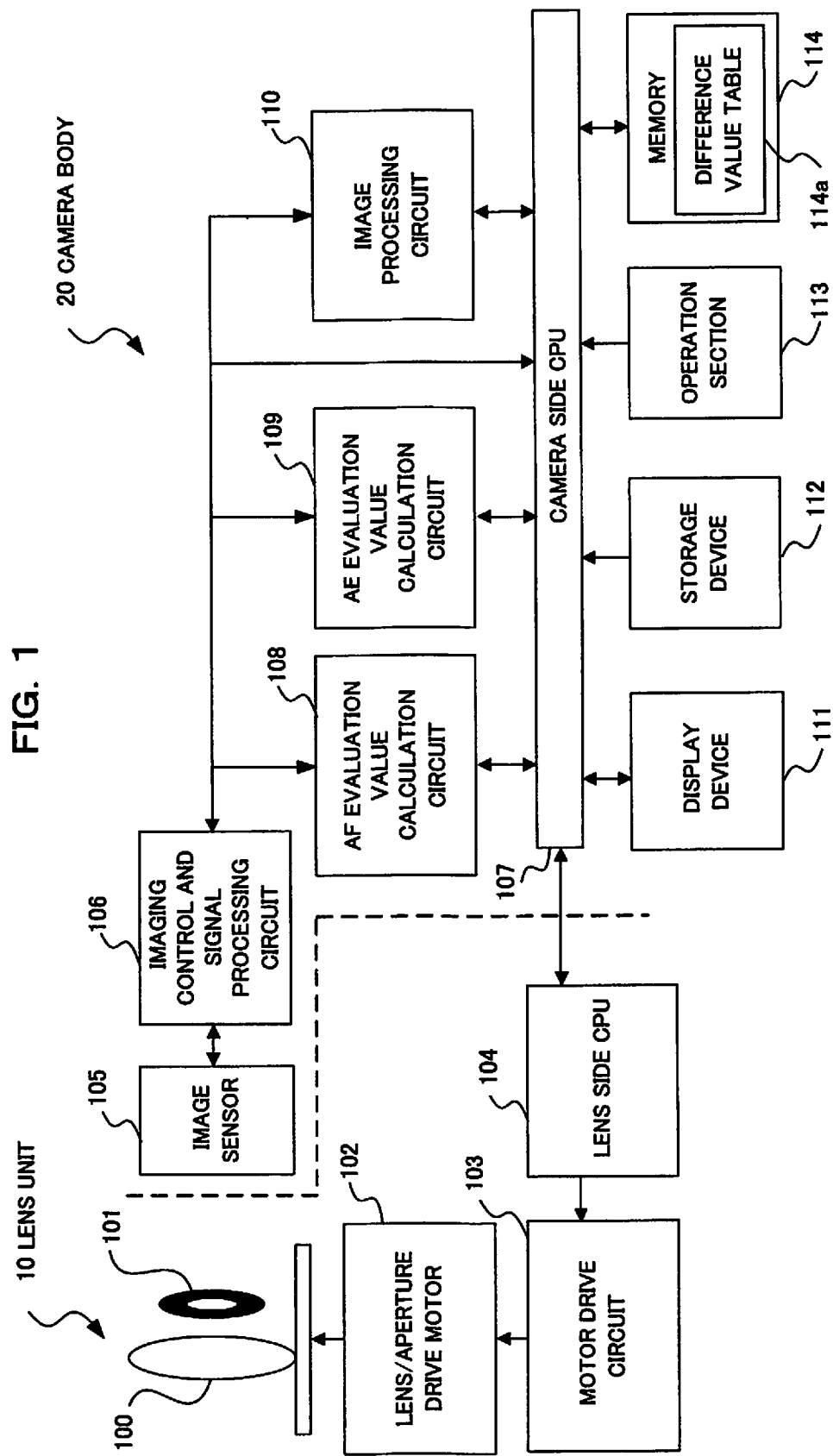
FIG. 1 is a block diagram mainly showing electrical circuits of a camera of a first embodiment of the present invention.

FIG. 1 is a block diagram mainly showing the electrical structure of the camera of the first embodiment. The camera of this embodiment is roughly separated into a lens unit 10 and a camera body 20. It should be noted that although the camera of this embodiment is a so-called lens interchangeable type camera that has a lens unit 10 fitted to the camera body 20, the lens unit 10 and the camera body 20 may also be constructed integrally. In this case, a lens side CPU 104 and a camera side CPU 107 may also be integrated.

The lens unit 10 comprises a photographing lens 100, an aperture 101, a lens/aperture drive motor 102 for driving the lens and the aperture, a motor drive circuit 103, and the lens side CPU 104. Also, the camera body 20 comprises an image sensor 105, an imaging control section and signal processing circuit 106, the camera side CPU 107, an AF (Auto Focus) evaluation value calculation circuit 108, and AE (Auto Exposure) evaluation value calculation circuit 109, an image processing circuit 110, a display device 111, a storage device 112, an operation section 113, and memory 114.

The photographing lens 100 has a plurality of optical lenses for forming a subject image. The plurality of optical lenses include a focus lens, and have a single focus lens, or a zoom lens. The aperture 101 is arranged on the optical axis of the photographing lens 100, close to an exit pupil of the photographing lens 100, and adjusts incident light amount and depth of focus. The aperture 101 motor drive circuit 103 and the focus lens within the photographing lens 100 are controlled by the camera side CPU 107, lens side CPU 104, and motor 102, and realize focus adjustment and aperture adjustment. It should be noted that the lens side CPU 104 interprets control commands that have been received from the camera side CPU 107, and controls the photographing lens 100 and the aperture 101.

The image sensor 105 is arranged on the optical axis of the photographing lens 100, and converts a subject image that has been formed by the photographing lens 100 to image data. Specifically, the image sensor 105 has pixels, that include photodiodes, arranged in a two-dimensional matrix, and accumulate charge in accordance with received light amount. The imaging control section and signal processing circuit 106 that has been connected to output of the image sensor 105 performs charge accumulation control and image signal readout control etc. for the image sensor 105. The image sensor 105 functions as an image sensor that subjects subject light that has passed through a photographing optical system to photoelectric conversion and outputs an image signal.

The imaging control section and signal processing circuit 106 performs amplification processing and signal processing such as AD conversion of an image signal that has been read out from the image sensor 105, and outputs image data. Amplification factor at the time of amplification processing has a relationship with imaging sensitivity SV, and this imaging sensitivity SV is used when calculating difference values at the time of contrast AF, as will be described later (refer to S11 in FIG. 3). The imaging sensitivity SV may be stored in a storage section, such as the memory 114, and imaging sensitivity that is set in the imaging control section and signal processing circuit 106 may be acquired from the imaging control section and signal processing circuit 106. Image data that has been read out from the image sensor 105 is outputs to the camera side CPU 107, AF evaluation value calculation circuit 108, AE evaluation value calculation circuit 109, and image processing circuit 110.

The camera side CPU 107 is a processor, and has a CPU (Central Processing Unit) and peripheral circuits. The camera side CPU 107 controls each section within the camera body 20 in accordance with programs that are stored in the memory 114. The camera side CPU 107 functions as a processor having an evaluation value calculation section, correction section, and focus detection section. The camera side CPU 107 also communicates with the lens side CPU 104 within the lens unit 10, and controls each section within the lens unit 10 by means of the lens side CPU 104. The camera side CPU 107 also receives various adjustment values for the lens unit 10, and status information of the focus lens on the aperture, from the lens side CPU 104.

Figure 9:
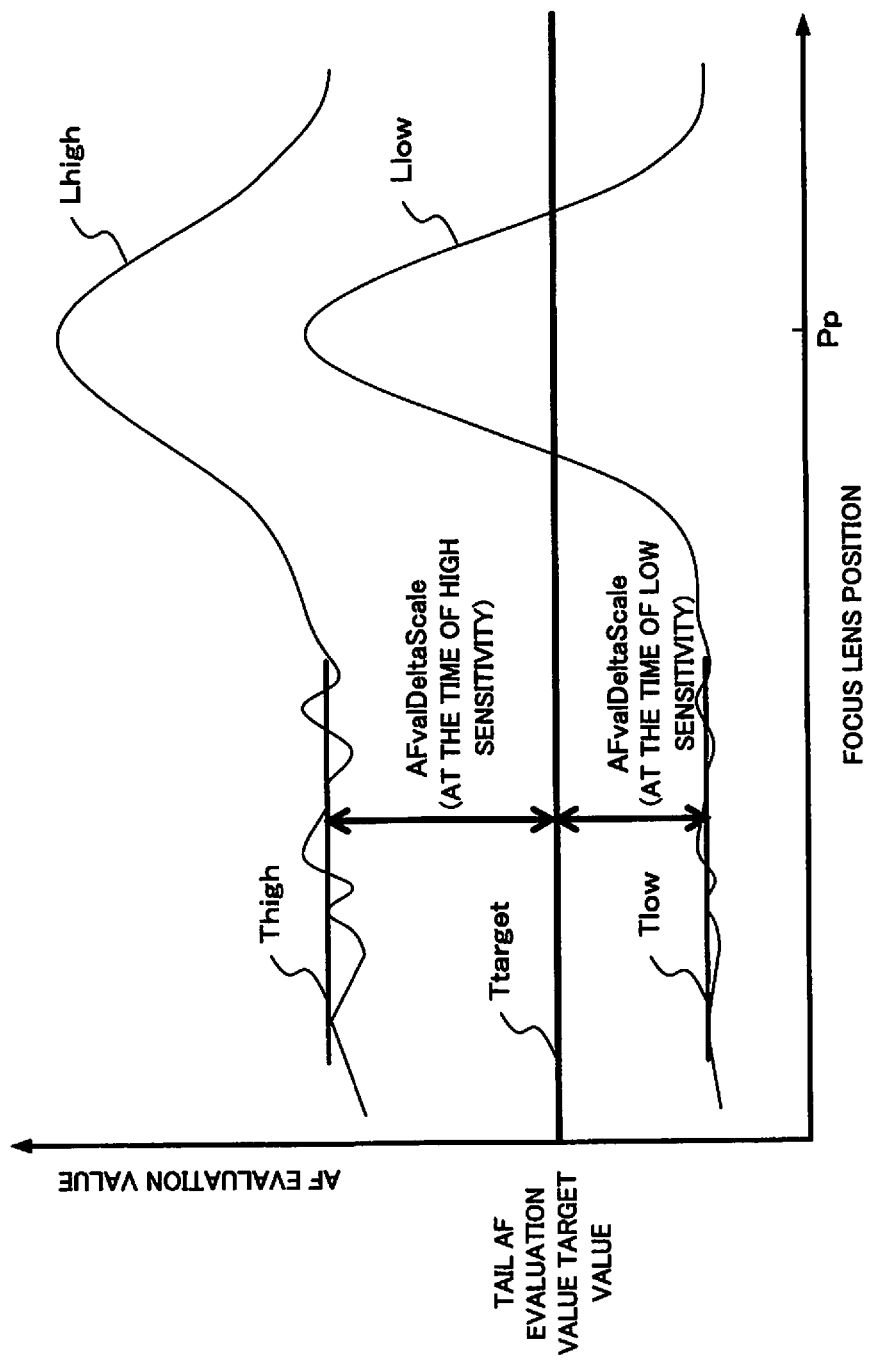
FIG. 9 is a graph showing tail AF evaluation value target values and difference values of contrast curves, in the camera of the first embodiment of the present invention.
Figure 10:
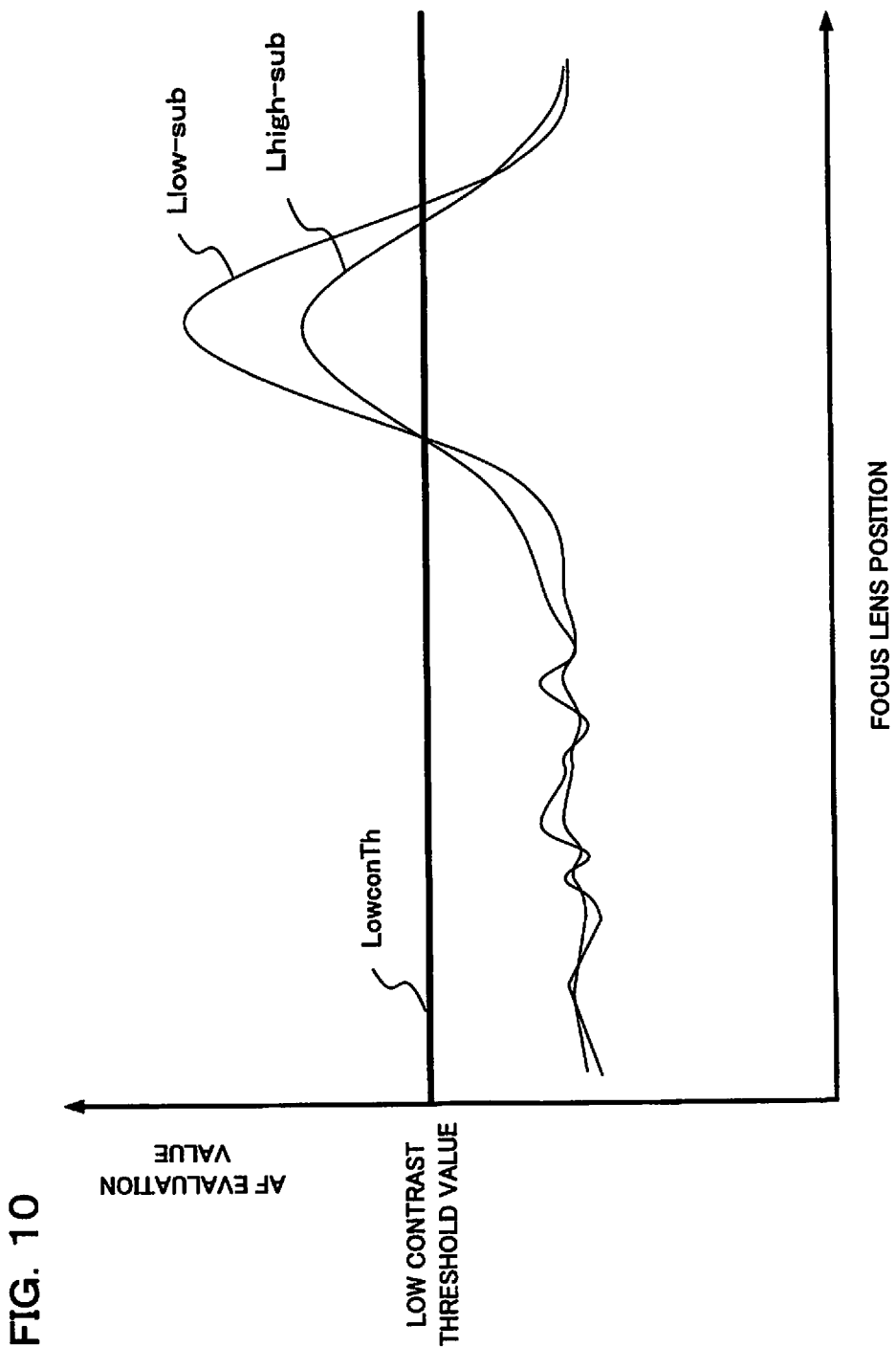
FIG. 10 is a graph showing a relationship between AF evaluation value and low contrast threshold value, in the camera of the first embodiment of the present invention.

The camera side CPU 107 functions as a correction section that corrects evaluation value in accordance with condition data at the time of acquisition of the evaluation value (refer, for example, to S19 in FIG. 3, and to FIG. 9 and FIG. 10). The above described conditions may be at least one from among imaging sensitivity of the image sensor, cut-off frequency of a HPF that is applied to an imaging signal in evaluation value calculation means, brightness level based on the imaging signal, or imaging drive mode of the image sensor. The camera side CPU 107 also functions as a focus detection section that, based on an evaluation value that has been corrected by the correction section, detects position of a focus lens at which this evaluation value exhibits and extreme value (refer, for example to S5 and S7 in FIG. 2). This focus detection section, when it is determined that the corrected evaluation is smaller than a specified threshold value, makes a determination threshold value for detecting a focus position at which the corrected evaluation value exhibits an extreme value stricter than when it is determined that the corrected evaluation value is greater than the specified threshold value (refer, for example, to S47 and S49 in FIG. 6, and S65 and S67 in FIG. 7).

The above described correction section selects or processes the correction value that has been read out from the memory (storage section), in accordance with the imaging sensitivity, HPF cut-off frequency, brightness level, and/or imaging drive mode, and subtracts the correction value that has been selected or processed from the evaluation value. As selection or processing, for example, selection may be performed from among values that have been read out, correction may be performed in accordance with area of an AF area, and interpolation computation may be performed using a plurality of values (refer, for example, to S15 and S17 in FIG. 3). Also, the correction section processes the correction value in accordance with all of the imaging sensitivity, HPF cut-off frequency, brightness level, and imaging drive mode, or in accordance with a combination of these values. For example, as shown in FIG. 8, interpolation computation may be performed in accordance with a combination of imaging sensitivity, cut-off frequency, and brightness level. This combination may be appropriately selected in accordance with characteristics of the camera.

Figure 11:
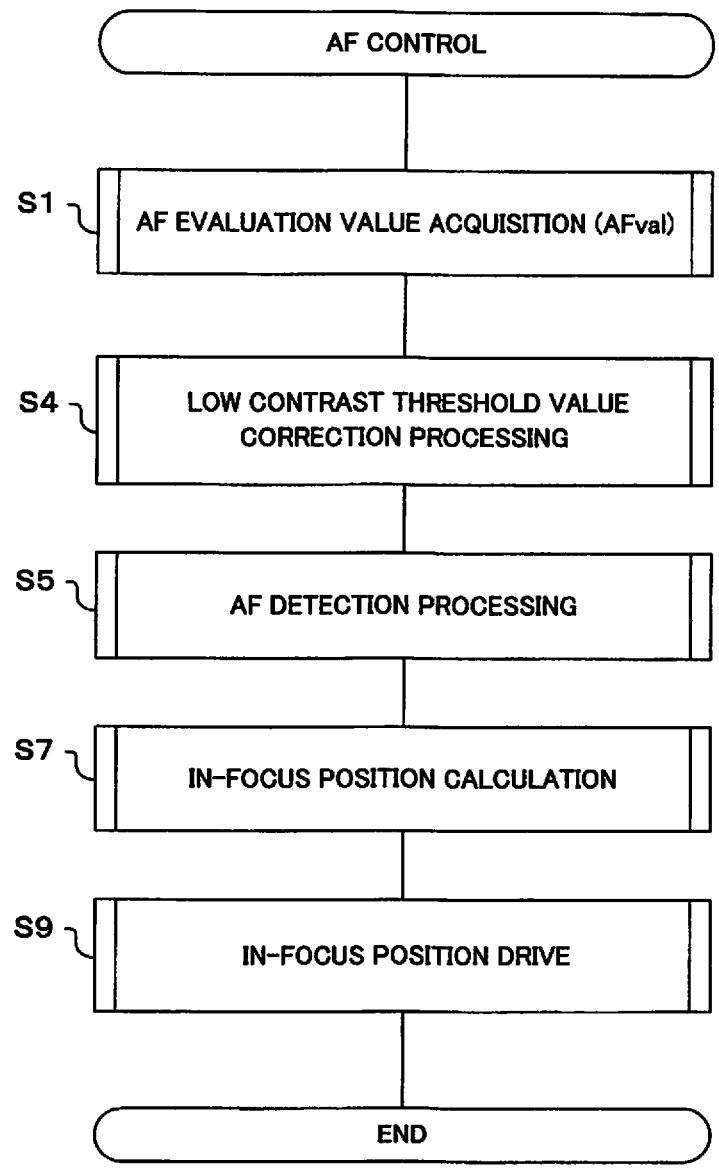
FIG. 11 is a flowchart showing an AF control operation of the camera of a second embodiment of the present invention.
Figure 12:
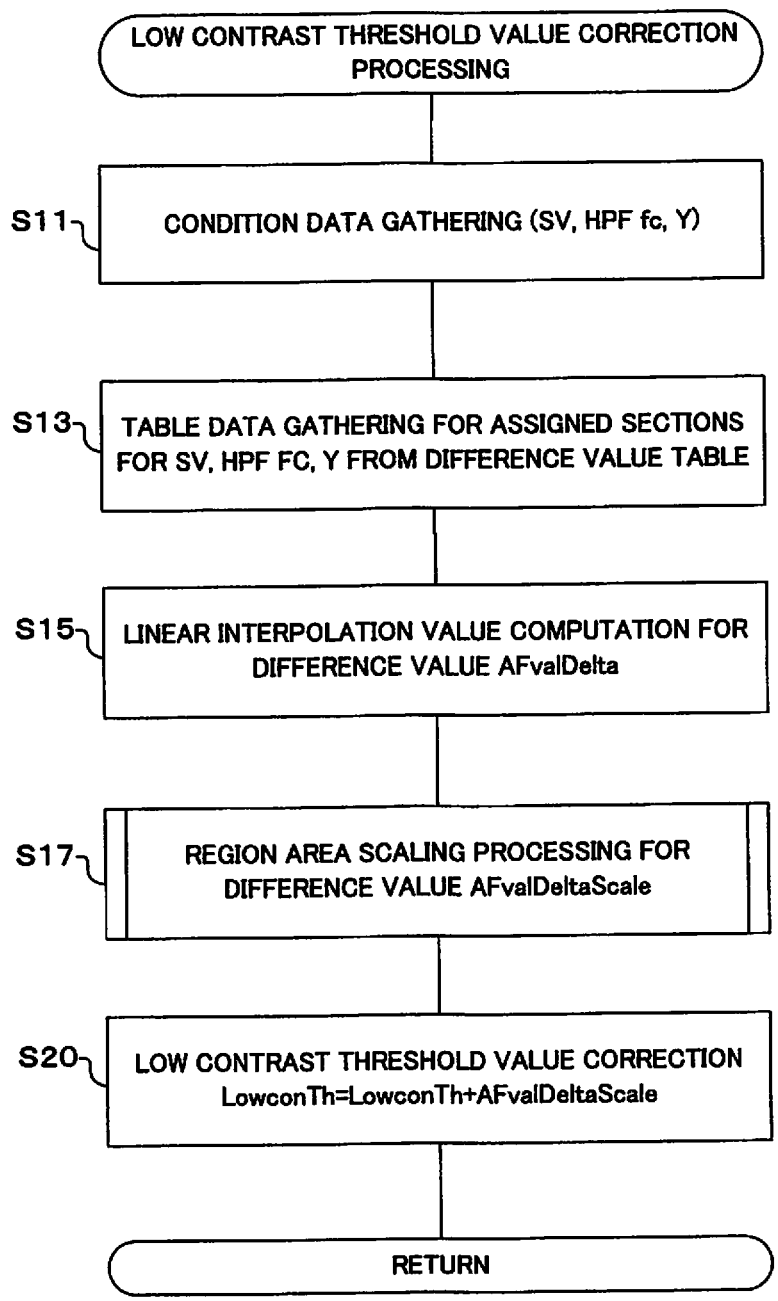
FIG. 12 is a flowchart showing low contrast threshold value correction processing in an AF control operation of the camera of the second embodiment of the present invention.

The camera side CPU 107 functions as a correction section that calculates a difference value for correcting levels of tail portions of an evaluation value curve to a fixed level, and corrects evaluation value or threshold value using this difference value (refer, for example, to S19 in FIG. 3, and S20 in FIG. 12). The camera side CPU 107 also functions as a focus detection section that, based on an evaluation value that has been corrected by the evaluation value calculation section, detects position of a focus lens at which this evaluation value exhibits an extreme value (refer, for example to S5 and S7 in FIG. 2 and FIG. 11). The focus detection section detects position of the focus lens in a state where a relative positional relationship between levels of the tail portions of the evaluation value curve, and threshold values, has become fixed, using the evaluation value or threshold value that has been corrected by the correction section (refer to S9 in FIG. 2, FIG. 10, S20 in FIG. 12, and FIG. 14). The above described correction section gathers condition data that has an effect on level of tail portions of the evaluation value curve, and obtains a difference value based on this condition data (refer, for example, to S11 and S15 in FIG. 3, and to S11 and S15 in FIG. 12).

The AF evaluation value calculation circuit 108 has a filter circuit, and extracts high-frequency components of image data that has been output from the image sensor 105 using the filter circuit, and calculates AF evaluation value. This filter circuit includes a high-pass filter HPF, and a cut-off frequency fc of the high-pass filter HPF may be stored in the memory 114. The cut-off frequency fc is used when calculating difference value at the time of contrast AF, as will be described later (referred to S11 in FIG. 3). The cut-off frequency fc may be stored in a storage section such as the memory 114, and cut-off frequency fc that is set in a filter circuit may be acquired from the filter circuit. AF evaluation value that has been calculated is output to the camera side CPU 107. The AF evaluation value calculation circuit 108 functions as an evaluation value calculation section that calculates an evaluation value that represents contrast, based on an imaging signal output from the image sensor.

The AE evaluation value calculation circuit 109 corrects brightness value in accordance with a photometric domain at the time of acquisition based on live view image data, and calculates brightness value of image data for focus adjustment. The AE evaluation value calculation circuit 109 also calculates exposure time (Tv) and aperture value (Av) so as to achieve appropriate exposure at the time of live view display and at the time of focus adjustment. A brightness value Y that has been calculated by the AE evaluation value calculation circuit 109 is used when calculating a difference value at the time of contrast AF, as will be described later (refer to S11 in FIG. 3). A brightness value Y may be temporarily stored in a storage section such as the memory 114, or a value that has been calculated by the AE evaluation value calculation circuit 109 may be acquired directly.

The image processing circuit 110 performs various image processing, such as demosaicing processing, tone conversion processing, white balance adjustment, edge processing etc. for image data that has been read out from the image sensor 105. Image data that has been subjected to image processing is stored in a storage medium that is detachable with respect to the camera body 20, provided within the storage device 112.

The display device 111 has a display panel that is arranged on a rear surface of the camera body 20, and/or an electronic viewfinder with which it is possible to view a monitor through an eyepiece. A live view image, playback image of an image that has been stored, and menu screens etc. are displayed on this display panel and electronic viewfinder.

The storage device 112 has an electrically rewritable storage medium, and stores image data that has been subjected to image processing, as was described previously. The storage device 112 also performs readout of image data that has been stored.

The operation section 113 is an interface for the user to input instructions to the camera, and has operation members such as a release button, power switch, touch panel etc. The operation section 113 detects operating states of the operation members and output results of detection to the camera side CPU 107. If the user operates the operation section 113, then based on this operating state the camera side CPU 107 controls the AF evaluation value calculation circuit 108, AE evaluation value calculation circuit 109, image processing circuit 110, memory 114 etc., and performs focus adjustment, exposure control, and image processing etc.

The memory 114 has an electrically rewritable nonvolatile memory, and stores programs that are used by the camera side CPU 107. The memory 114 also stores various adjustment values that are used in the camera. The memory 114 further stores a difference value table 114*a*. The difference value table 114*a* is made up of different values in accordance with condition data such as imaging sensitivity, HPF cut-off frequency, brightness level, imaging drive mode etc. Data that is stored in the difference value table 114*a* will be described later using FIG. 8. The memory 114 storing the difference value table 114*a* functions as a memory (storage section) for storing correction values based on the imaging sensitivity, HPF cut-off frequency, brightness level, and imaging drive mode.

Next, AF control (focus adjustment operation) of this embodiment will be described using the flowcharts shown in FIG. 2 to FIG. 7. This flow is executed by the camera side CPU 107 controlling each of the sections and circuit shown in FIG. 1, based on programs that have been stored in the memory 114.

Figure 2:
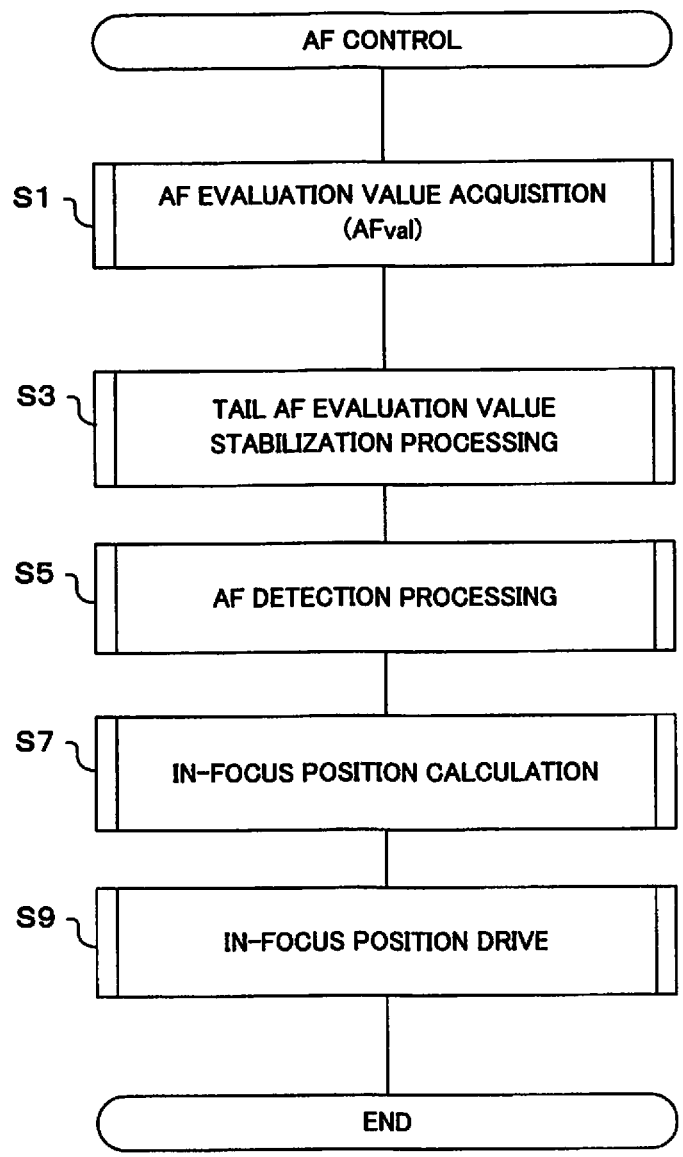
FIG. 2 is a flowchart showing an AF control operation of the camera of the first embodiment of the present invention.

If the user presses the release button down halfway, the flow for AF control shown in FIG. 2 is commenced, and an AF evaluation value AFval is first acquired (S1). Here, once image data for a single frame has been output from the image sensor 105, the AF evaluation value calculation circuit 108 calculates AF evaluation value AFval. The AF evaluation value calculation circuit 108 has a filter circuit, as was described previously, and extracts image data of a specified high frequency component and outputs this image data that has been extracted as an AF evaluation value AFval.

Once an AF evaluation value has been acquired, next, tail AF evaluation value stabilization processing is executed (S3). An AF evaluation value curve can be obtained by moving the focus lens and connecting AF evaluation values for each focus lens position, as shown in FIG. 9 and FIG. 10. This AF evaluation value curve becomes a peak at an in-focus position, and has tails that extend both sides of the peak. If imaging sensitivity SV is high (if amplification factor of the imaging control section and signal processing circuit 106 is large, etc.) level of AF evaluation values becomes high, including at tail portions. On the other hand if imaging sensitivity SV is low, all levels, including the tail levels, become low. It should be noted that tail levels may also fluctuate in accordance with condition data, such as cut-off frequency of the high-pass filter (HPF) of the AF evaluation value calculation circuit 108, brightness level, imaging drive mode, etc., and not just imaging sensitivity. In this step, the camera side CPU 107 performs processing to stabilize the AF evaluation values at the tails. Specifically, difference values are calculated taking into consideration condition data such as imaging sensitivity, and correction is performed so that levels of AF evaluation value at tail portions become close to target values for AF evaluation value, as shown in FIG. 10, by subtracting the difference values from (or adding them to) the AF evaluation values. Details of this tail AF evaluation value stabilization processing will be described later using FIG. 3.

If tail AF evaluation value stabilization processing has been performed, next AF detection processing is performed (S5). Here, the camera side CPU 107 determines drive direction of the focus lens using AF evaluation values that have been subjected to the stabilization processing in step S3, and further performs detection of an AF evaluation value peak. Detailed operation of this AF detection processing will be described later using FIG. 5.

If AF detection processing has been performed, next an in-focus position is calculated (S7). Here, the camera side CPU 107 calculates an in-focus position using AF evaluation values in the vicinity of a peak position that was detected in the AF detection processing of step S5. This in-focus position may be obtained by known three-point interpolation calculation, using AF evaluation values for three points that are close to the peak position, for example Once an in-focus position has been calculated, next, in-focus position drive is performed (S9). Here, the camera side CPU 107 moves the focus lens to an in-focus position that was obtained in step S7 using the lens side CPU 104 etc. Once the focus lens has been driven to the in-focus position, flow for AF control is terminated.

Next, the tail AF evaluation value stabilization processing of step S3 (refer to FIG. 2) will be described using the flowchart shown in FIG. 3. If the tail AF evaluation value stabilization processing is commenced, first, condition data is gathered (S11). Here, condition data that has an effect on tail levels of the AF evaluation values is gathered. As was described previously, levels of details of the AF evaluation values fluctuates in accordance with condition data such as shooting sensitivity (SV), cutoff frequency (fc) of a high-pass filter HPF, brightness value (Y) etc. In this step, these condition data are collected. Shooting sensitivity (SV) is obtained from amplification factor of the imaging control section and signal processing circuit 106. Also, HPF cutoff frequency (fc) may be acquisition of cut-off frequency of a filter circuit that is set in the AF evaluation value calculation circuit 108. Brightness value (Y) may be acquisition of brightness value (Y) of a subject that has been detected by the AE evaluation value calculation circuit 109. Also, as was described previously, these data may be stored in the memory 114 and read out. It should be noted that condition data collected here may be data that is used in order to calculate difference values, may be some part of condition data of the imaging sensitivity SV, HPF fc, and brightness Y, or may be acquisition of condition data other than these.

If condition data has been collected, next adjacent data of assigned sections for Sv, HPF fc and Y is gathered from a difference value table (S13). Difference values are calculated in the next step S15. Specifically, difference values stored in the difference value table 114a in step S13 are read out, and difference values that have been subjected to interpolation computational processing are obtained using difference values that were read out in step S15. In this step S13, the camera side CPU 107 reads out adjacent data of pertinent assigned sections from the difference value table 114a using condition data that was gathered in step S11.

Read out of exemplary data of pertinent assigned sections from the difference value table 114a will be described using FIG. 8. With the example shown in FIG. 8 exemplary data for different values of assigned sections is read out as condition data, based on three items of data, namely shooting sensitivity SV, HPF cutoff frequency fc, and brightness Y. In the difference value table 114a, brightness value Y is divided into 6 divisions, with tables GR1 to GR6 being stored for every division of brightness value Y (in FIG. 8, only tables GR1, GR2 and GR6 are shown). Tables GR1 to GR6 corresponding to divisions that contain the brightness value Y that was obtained in step S1*l* are selected. The vertical axis direction of each table GR1 to GR6 has HPF cut-off frequency fc divided into 6 divisions, and the horizontal axis direction has shooting sensitivity SV divided into 6 divisions. In this way, since exemplary data for different values of assigned sections is stored in the tables GR1 to GR6, exemplary data for difference values corresponding to assigned sections that contain the SV, HPF fc and Y that were collected in step S11 are read out.

It should be noted that in the difference value table 114a shown in FIG. 8, description has been given for a case where three sets of data are used, namely shooting sensitivity SV, HPF cutoff frequency fc and brightness value Y. However, this is not limiting and imaging drive mode, temperature, time from when the camera was turned on etc. may be added as conditions, and other appropriate combinations of imaging sensitivity Sv, cutoff frequency fc and brightness value Y may be used. This is because, depending on the imaging drive mode, noise appearance conditions will vary with different methods of read out at the time of readout of an imaging signal from the image sensor (for example, whether or not there is pixel mixing, number of pixels that will be mixed, etc.). It is also easy for noise to appear in an imaging signal if temperature of the image sensor rises, because the image sensor is subject to thermal effects with rising temperature within the camera in accordance with time from when the camera was turned on, and it becomes easy for noise to appear in an imaging signal. Condition data that is collected in step S11 may be determined in accordance with conditions in the difference value table 114a.

Returning to the flow shown in FIG. 3, if exemplary data for difference values has been read out from the difference value table in step S13, next a linear interpolation value for difference value is calculated (S15). Here, the camera side CPU 107 performs linear interpolation calculation using exemplary data for eight difference values that have been readout in step S13, to obtain a difference value AFvalDelta.

Once linear interpolation value for difference value has been calculated, next, region area scaling processing for difference value is performed for the difference value (S17). AF evaluation value is a cumulative addition value of high frequency components of pixel data within an AF area that has been set in the image sensor 105, and when there is fixed contrast in an AF area, the AF evaluation value becomes larger with increase in area of the AF area. The camera side CPU 107 therefore corrects difference value in accordance with magnitude of the area of the AF region. Details of this region area scaling processing for difference value will be described later using FIG. 4.

This difference value will be described using FIG. 9. In FIG. 9, the horizontal axis represents position of the focus lens, and the vertical axis represents AF evaluation value for each position. Curve Lhigh represents an AF evaluation value curve at the time of high sensitivity, while curve Llow represents an AF evaluation value curve at the time of low sensitivity. Each of the curves Lhigh and Llow reaches a peak close to a focus lens position Pp. As will be understood from FIG. 9, the AF evaluation value curve Lhigh for high-sensitivity is largely made up of high values, including the peak and the tails, while the AF evaluation value curve Llow for low sensitivity is largely made up of low values.

In FIG. 9, a tail AF evaluation target value Target is a target value for tail levels of the AF evaluation value curve. The levels of the tails of the curves differ for high sensitivity and low sensitivity. Specifically, in the example shown in FIG. 9, tails of the high-sensitivity AF evaluation value curve Lhigh are at level Thigh, while tails of the low-sensitivity AF evaluation value curve Llow are at level Tlow. A difference value AFvalDeltaScale (for high sensitivity) at the time of high sensitivity is a difference between the tail level Thigh and the tail AF evaluation value target value Ttarget. Also, a difference value AFvalDeltaScale (for low sensitivity) at the time of low sensitivity is a difference between the tail level Tlow and the tail AF evaluation value target value Ttarget. It should be noted that in FIG. 9 a difference value is made AFvalDeltaScale, and is made a numerical value that is calculated using region area scaling processing for difference value (S17 in FIG. 3). However, this is not limiting, and may be represented as, for example, difference value AFvalDelta (calculation in S15 in FIG. 3).

Returning to the flow of FIG. 3, if region area scaling processing for difference value has been performed in step S17, difference value subtraction processing is performed (S19). Here, the camera side CPU 107 subtracts a difference value AFvalDeltaScale that has been subjected to the region area scaling processing, that was calculated in step S17, from an AF evaluation value AFval that was acquired in step S1. Specifically, an AF evaluation value AFval that has had a difference value subtracted is obtained using equation (1) below.

$$AFval = AFval - AFvalDeltaScale \tag{1}$$

It should be noted that depending on whether the difference value is positive or negative, addition computation may be performed instead of subtraction computation.

A high sensitivity AF evaluation value curve Lhigh-sub and a low sensitivity AF evaluation value curve Llow-sub after having performed subtraction processing of the difference value, are shown in FIG. 10. Since the difference value has been subtracted from the AF evaluation value, then compared to the graph shown in FIG. 9 it will be understood that the tail levels of both curves are substantially the same.

Figure 6:
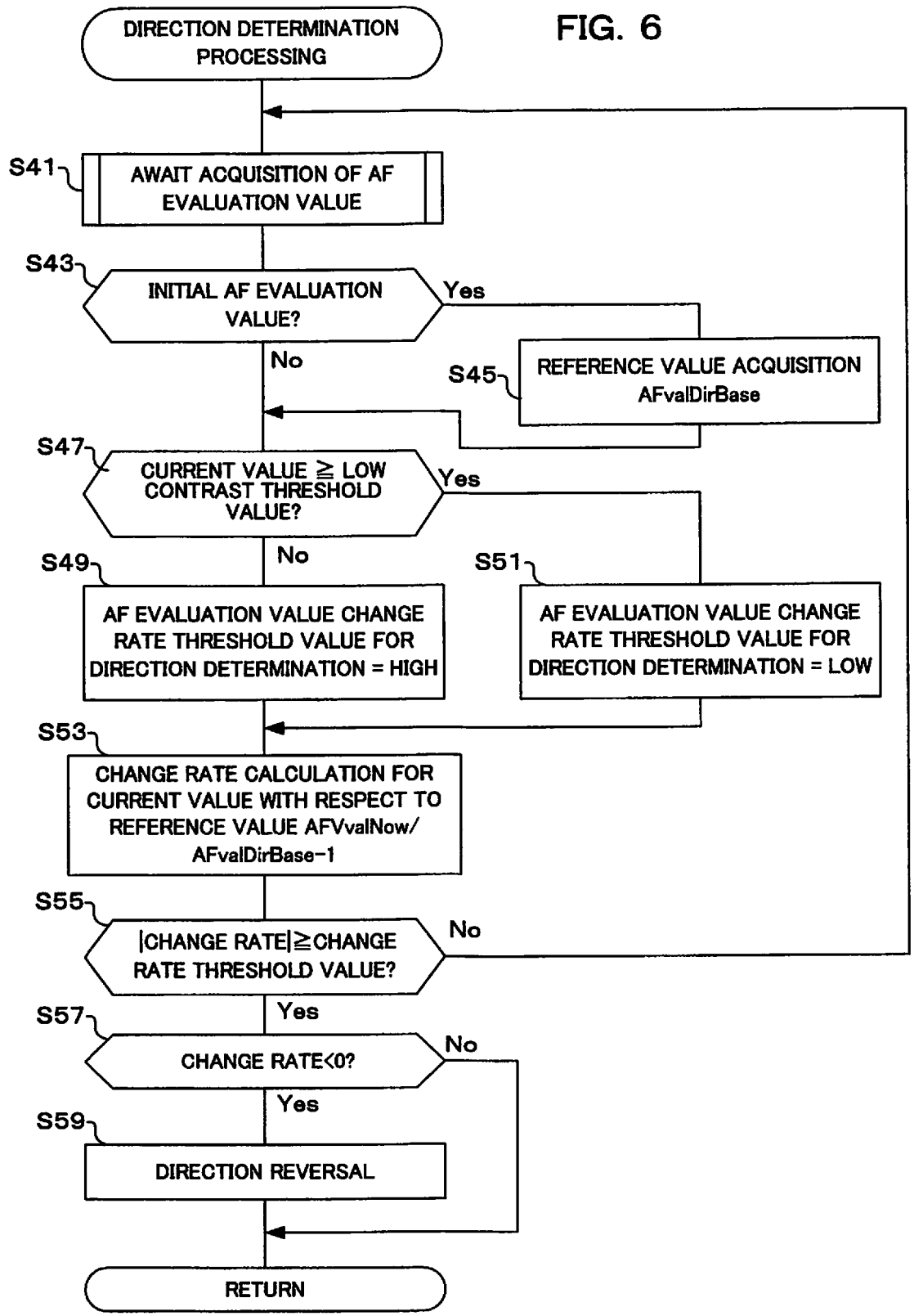
FIG. 6 is a flowchart showing direction determination processing of the camera of the first embodiment of the present invention.

A low contrast threshold value LowconTh is a threshold value for change rate threshold value setting that is used at the time of peak detection and direction determination for the AF evaluation value, and is stored in memory (refer to S47 in FIG. 6 and S65 in FIG. 7 for details).

Returning to the flow of FIG. 3, if difference value subtraction processing has been performed in step S19, the tail AF evaluation value stabilization processing is terminated and the originating flow is returned to.

In this way, in the flow for tail AF evaluation value stabilization processing, if level of an AF evaluation value curve becomes large, or becomes small, depending on condition data such as shooting sensitivity, a difference value is calculated, and the difference value is subtracted from the AF evaluation value. This means that it is possible to make level of tail portions of an AF evaluation value curve substantially the same as a predetermined tail AF evaluation value target value, and it is possible to prevent erroneous peak detection at the time of the detection of AF evaluation value using low contrast threshold value LowconTh.

Figure 4:
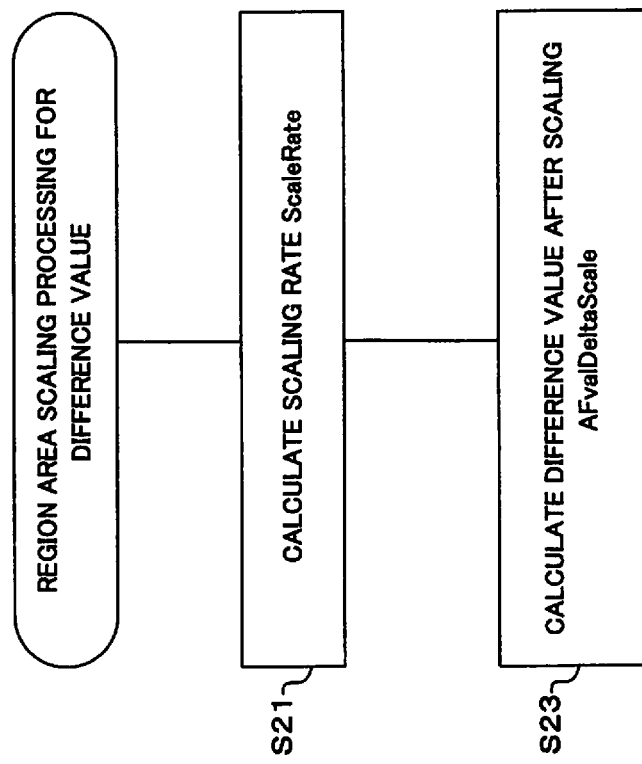
FIG. 4 is a flowchart showing region area scaling processing for difference value in the camera of the first embodiment of the present invention.

Next, the region area scaling processing for difference value of step S17 (refer to FIG. 3) will be described using the flowchart shown in FIG. 4. As was described previously, since area of the AF area changes in accordance with AF area automatic setting corresponding to size of the subject, and user settings etc., in this flow a difference value is corrected in accordance with the area of the AF area.

Once this processing is commenced, first, a scaling rate is calculated (S21). The scaling rate ScaleRate is calculated using equation (2) below, with real AF region area made Areal, and area of an AF region constituting a reference made Ast. The standard AF area area Ast is area of an AF area that was made a reference at the time of creating the difference value table 114a. Also, area of real AF region Areal is area of an AF region at the time AF evaluation value was acquired in step S1.

$$ScaleRate = Areal/Ast \quad (2)$$

Once scaling rate has been calculated, next a difference value after scaling is calculated (S23). Here, a difference value AFvalDeltaScale after scaling is calculated from equation (3) below, using a difference value AFvalDelta resulting from linear interpolation that was calculated in step S15, and scaling rate ScaleRate that was calculated in step S21.

$$AFvalDeltaScale = AFvalDelta * ScaleRate \quad (3)$$

It should be noted that * means multiply. If a difference value after scanning has been calculated, the originating flow is returned to.

In this way, with the region area scaling processing for difference value, for a difference value that has been calculated based on a difference value stored in the memory 114, a value is given that has been corrected in accordance with the area of a real AF area.

Next, the AF detection processing of step S5 (refer to FIG. 2) will be described using the flowchart shown in FIG. 5. With focus adjustment using a contrast method, a focus lens is moved in a specified direction along the optical axis, and at each position an AF evaluation value is calculated by extracting high-frequency components of image data within an AF area that has being output from the image sensor 105. A position of the focus lens at which this AF evaluation value reaches a peak is an in-focus position. With the AF detection processing flow, in order to detect a position where the AF evaluation value peak arises, direction in which the focus lens is moved is first detected (direction determination processing of S31). This direction is a direction in which the AF evaluation value increases in response to movement of the focus lens. If direction has been determined, a position of the focus lens at which AF evaluation value changes from increasing to decreasing is detected while moving the focus lens in this direction (peak detection processing of S33).

Figure 5:
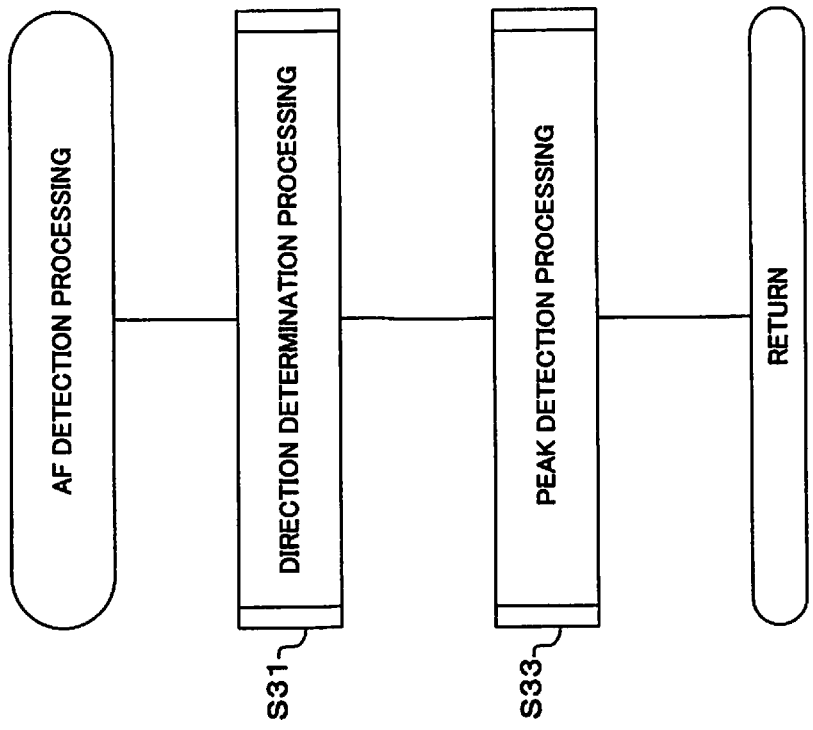
FIG. 5 is a flowchart showing AF detection processing of the camera of the first embodiment of the present invention.

If the flow for AF detection processing shown in FIG. 5 is commenced, first, direction determination processing is performed S31. Here, the camera side CPU 107 determines whether or not the AF evaluation value is increasing based on a ratio of AF evaluation value constituting a reference and a current AF evaluation value. If the result of determination is that AF evaluation value is reducing, the camera side CPU 107 reverses the drive direction of the focus lens, while if the AF evaluation value is increasing the drive direction is kept as it is. It should be noted that in the determination as to whether or not AF evaluation value is increasing, a change rate threshold value for direction determination is made different using the previously described low contrast threshold value (refer to FIG. 9) (refer to S47 to S51 in FIG. 6, which will be described later). Detailed operation of this direction determination processing will be described later using FIG. 6.

Once direction determination processing has been performed, next, peak detection processing is performed (S33). Here, the camera side CPU 107 determines that the AF evaluation value has passed a peak if a rate of decrease of the current AF evaluation value from a maximum value of AF evaluation value up to now is larger than a peak detection change rate threshold value. This peak detection change rate threshold value is also made a different value in accordance with whether the AF evaluation value is larger than or smaller than the previously described low contrast threshold value (refer to FIG. 9). Detailed operation of this peak detection processing will be described later using FIG. 7. If the peak detection processing is terminated, the originating flow is returned to.

Next, the direction determination processing in step S31 will be described using the flowchart shown in FIG. 6. If flow for direction determination processing is commenced, first, acquisition of AF evaluation value is awaited (S41). The lens side CPU 104 moves the focus lens by a specified amount using the lens/aperture drive motor 102, the image sensor 105 performs acquisition of image data for a single frame, and the AF evaluation value calculation circuit 108 calculates an AF evaluation value for an AF area from the image data. In this step, the camera side CPU 107 is in a standby state until an AF evaluation value is acquired using image data of a single frame.

Once the AF evaluation value has been acquired, it is next determined whether or not it is an initial AF evaluation value (S43). With focus adjustment using a contrast method, an AF evaluation value is calculated while moving a focus lens, and a position of the focus lens at which this AF evaluation value becomes a peak is made an in-focus position. Here, the camera side CPU 107 determines whether or not it is an AF evaluation value that was initially acquired, at the time of acquisition of a series of AF evaluation values.

If the result of determination in step S43 is that it is the first time an AF evaluation value has been acquired, a reference value is acquired (S45). Here, the camera CPU 107 makes an AF evaluation value that was acquired in step S41 (initial AF evaluation value) a reference value AFvalDirBase, and stores this value.

If a reference value has been acquired in step S45, or if the result of determination in step S43 was that acquisition of AF evaluation value was not the first time, it is next determined whether or not a current value (current AF evaluation value) is greater than or equal to a low contrast threshold value (S47). Here, the camera side CPU 107 compares an AF evaluation value that has been most recently acquired (refer to S41) (current value) with the low contrast threshold value (refer to LowconTh in FIG. 10), to determine whether or not current value low contrast threshold value.

If the result of determination in step S47 is that the current value is not greater than or equal to the low contrast threshold value, an AF evaluation value change rate threshold value for direction detection is set to "high" (large) (S49). On the other hand if the current value is greater than or equal to the low contrast threshold value, the AF evaluation value change rate threshold value for direction detection is set to "low" (small) (S51). Movement direction of the focus lens is determined if the AF evaluation value change rate is greater than a predetermined value. Specifically, if the AF evaluation value change rate is small there is also a possibility that the change in AF evaluation rate will merely be noise in an error range, and so determination of focus lens movement direction is performed if the AF evaluation change rate is larger than a threshold value. Here, the above described noise means a nose component of the AF evaluation value, and this is attributable to imaging noise. Signal undulations arise in HPF output in accordance with amplitude of imaging noise, resulting in AF evaluation value noise. Since HPF output value also becomes large if amplitude of imaging noise becomes large, an AF evaluation value at the time of high sensitivity has raised tail levels, and fluctuation arises. In the graphs shown in FIG. 9 and FIG. 10, since there are large fluctuations in AF evaluation value due to noise etc. in the vicinity of the tails of the AF evaluation value curve, if change rate threshold value for direction determination is made small it becomes more likely that the system will be affected by noise. On the other hand since an imaging signal component is larger than the areas of the tail section in the vicinity of the peak, the effects of noise will be reduced. Therefore, in a case where current AF evaluation value is smaller than the low contrast threshold value a change rate threshold value for direction determination is set to "high" (large) since the AF evaluation value is in the tail regions of the AF evaluation curve, and in a case where the current AF evaluation value is larger than the low contrast threshold value the change rate threshold value for direction determination is set to "low" (small) because the AF evaluation value is close to a peak of the AF evaluation value curve.

If an AF evaluation value change rate threshold value for direction detection has been set in step S49 or S51, next a change rate for a current value with respect to a reference value is calculated (S53). Here, the camera side CPU 107 divides a current AF evaluation value AFvalNow by the reference value AFvalDirBase that was acquired in step S45, and calculates change rate R by subtracting 1 from this divided value. Specifically, the change rate R is calculated from equation (4) below.

$$R=(AFvalNow/AFvalDirBase)-1 \quad (4)$$

If the change rate has been calculated in step S53, it is next determined whether or not an absolute value of the change rate is greater than or equal to a change rate threshold value (S55). Here, the camera side CPU 107 determines whether or not absolute value of the change rate R that was calculated in step S53 is greater than or equal to a change rate threshold value for direction determination that was set in step S49 or S51. If the result of this determination is that absolute value of the change rate is smaller than the change rate threshold value for direction determination, processing returns to step S41. Specifically, in a case where change rate for the current value is smaller than the change rate threshold value for direction determination then the focus lens is moved by a specified amount with the drive direction kept the same, image data for a single frame is acquired from the image sensor 105, and the previously described processing is executed. During this processing, if the current AF evaluation value becomes greater than or equal to the low contrast threshold value, the change rate threshold value for direction determination is changed to "low" (small).

If the result of determination in step S55 is that absolute value of the change rate has become greater than or equal to the change rate threshold value for direction determination, it is determined whether or not the change rate is smaller than 0, that is, whether or not the change rate is a negative value (S57). If the result of this determination is that the change rate is smaller than 0 the direction is reversed (S59). Here, the camera side CPU 107 reverses the drive direction of the focus lens, by means of the lens side CPU 104. If the change rate is negative, the drive direction of the focus lens is not in the direction of a peak of AF evaluation value, and so the drive direction is reversed. On the other hand, if the change rate is greater than or equal to 0 the drive direction of the focus lens is maintained as it is. If the drive direction has been reversed in step S59, or if the result of determination in step S57 is that the change rate is greater than or equal to 0, the direction determination processing is terminated and the originating flow is returned to.

In this way, with the flow for direction determination processing, the focus lens is moved in a specified direction, and whether to maintain or reverse the drive direction is determined based on whether or not change rate of AF evaluation value at this time is smaller than 0 (refer to S57 and S59). Also, this determination for change rate is only performed if change rate for current value, with respect to a reference value, is greater than a change rate threshold value for direction determination. As a result the effects of noise are mitigated, and it is possible to prevent erroneous direction determination.

It should be noted that in the flow shown in FIG. 6 an initial AF evaluation value was made a reference value (refer to S45), and change rate of AF evaluation value was calculated using this reference value (refer to S53). However, assigning a reference value for AF evaluation value is not limited to this method, and another method may be used, such as using AF evaluation values for a number of times immediately prior, or using an immediately prior AF evaluation value. Also, a ratio of reference value and current value was used in direction determination, but this is not limiting and direction determination may be performed by, for example, calculating a difference and comparing this difference value with a threshold value.

Next, the peak detection processing of step S33 (refer to FIG. 5) will be described using the flowchart shown in FIG. 7. This flow for peak detection processing is executed after the flow for direction determination processing that was shown in FIG. 6 is completed. Specifically, with peak detection processing, after drive direction of the focus lens has been decided, a peak of AF evaluation value is detected while moving the focus lens in this drive direction.

If the flow for peak detection processing is commenced, first, acquisition of AF evaluation value is awaited (S61). If focus lens drive direction has been decided on in steps S57 and S59, then the focus lens is driven in this direction, and image data for one frame is acquired. Once image data for one frame has been acquired, the AF evaluation value calculation circuit 108 calculates an AF evaluation value for an AF area using the image data. In this step, the camera side CPU 107 is in a standby state until an AF evaluation value is acquired using image data of a single frame.

Once an AF evaluation value has been acquired, next, maximum value AFvalMax is updated (S63). When an initial AF evaluation value has been acquired after commencement of peak detection processing, the camera side CPU 107 stores this AF evaluation value as the maximum value AFvalMax. The second and subsequent times that an AF evaluation value is acquired, the camera side CPU 107 compares the newly acquired AF evaluation value with the maximum value AFvalMax that has been stored, and updates the larger value as maximum value AFvalMax.

Once the maximum value has been updated, it is next determined whether or not the maxim is greater than or equal to the low contrast threshold value (S65). Here, the camera side CPU 107 compares the maximum value that was updated in step S63 with the low contrast threshold value (refer to LowconTh in FIG. 10), and determines whether or not the maximum value is greater than or equal to the low contrast threshold value.

If the result of determination in step S65 is that the maximum value is not greater than or equal to the low contrast threshold value, an AF evaluation value change rate threshold value for peak detection is set to "high" (large) (S67). On the other hand if the maximum value is greater than or equal to the low contrast threshold value, the AF evaluation value change rate threshold value for peak detection is set to "low" (small) (S69). At the time of a peak detection the focus lens is moved in a direction in which AF evaluation value increases, as a result of the direction determination of FIG. 6. Accordingly, with peak detection a position at which the AF evaluation value changes from increasing to decreasing may be detected. Therefore, if a rate of decrease of the AF evaluation value is calculated, it is determined that a peak has been passed if this rate of decrease is larger than the peak detection change rate threshold value. In this case, in order to remove the effects of noise at tails of the AF evaluation value curve (that is, a region in which the AF evaluation value is smaller than the low contrast threshold value), the peak detection change rate threshold value is set large. On the other hand, in a region that is close to a peak of the AF evaluation value curve (that is, a region where the AF evaluation value is larger than the low contrast threshold value), the peak detection change rate threshold value is set small because there is no need to consider the effects of noise.

If setting of peak detection change rate threshold value has been performed in steps S67 and S69, next a rate of decrease for current value with respect to the maximum value is calculated (S71). Here, the camera side CPU 107 calculates rate of decrease Rd based on equation (5) below.

$$Rd=1-(AFvalNow/AFvalMax) \qquad (5)$$

Here, AFvalNow is the immediately prior AF evaluation value that was acquired in step S61 (current value), and AFvalMax is a maximum value of evaluation value that was updated in step S63.

Next, it is determined whether or not the rate of decrease is greater than the peak detection change rate threshold value (S73). Here, the rate of decrease Rd that was calculated in step S71 and the peak detection change rate threshold value that was set in step S67 or S69 are compared, and it is determined whether or not rate of decrease >change rate threshold value. If the result of this determination is that the rate of decrease is less than the peak detection change rate threshold value, processing returns to step S61. Specifically, in a case where rate of decrease is less than the peak detection change rate threshold value then the focus lens is moved by a specified amount with the drive direction kept the same, image data for one frame is acquired from the image sensor 105, and the previously described processing is executed. During this processing, the maximum value may also be changed to the current AF evaluation value in the processing of step S65. That is, in step S65 it is determined whether the current AF evaluation value is greater than or equal to the low contrast threshold value, and if the current AF evaluation value is smaller than the low contrast threshold value the peak detection change rate threshold value may be changed to "high" (large).

On the other hand if the result of determination in step S73 is that the rate of decrease has become larger than the peak detection change rate threshold value, the flow for peak detection processing is terminated and the originating flow is returned to. If the originating flow is returned to, an in-focus position is calculated in step S7.

In this way, in the flow for peak detection processing shown in FIG. 7, a rate of decrease of AF evaluation value is calculated, and if this rate of decrease becomes larger than a peak detection change rate threshold value it is determined that a peak has been passed (refer to S73). Also, peak detection change rate threshold value is made a different value depending on whether or not the maximum value AFvalMax for AF evaluation value is larger than the low contrast threshold value. Specifically, if the maximum value AFvalMax is smaller than the low contrast threshold value then peak detection change rate threshold value is set high (large), while if maximum value AFvalMax is larger than the low contrast threshold value the peak detection change rate threshold value is set low (small). As a result it is possible to prevent erroneous determination of a peak at tails of an AF evaluation value curve that are likely to be subject to the effects of noise. Also, even if maximum value AFvalMax is greater than or equal to the low contrast threshold value, if the current AF evaluation value AFvalNow is smaller than the low contrast threshold value a similar effect is obtained even if peak detection change rate threshold value is set to high (large).

It should be noted that in the flow of FIG. 7, rate of decrease was calculated from a ratio of maximum value and current value (refer to S71). However, when performing peak detection, this method is not limiting, and instead of updating the maximum value, other values may be used, such as using a number of the most recent AF evaluation values, or the latest AF evaluation value. Also, a ratio of maximum value and current value was used in peak determination, but this is not limiting and peak determination may be performed by, for example, calculating a difference and comparing this difference value with a threshold value.

In this way, with the first embodiment of the present invention, an image signal is output by subjecting subject light that has passed through a photographing optical system to photoelectric conversion using an image sensor, and an evaluation value that represents contrast is calculated based on this image signal (refer to S1 in FIG. 2). Also, evaluation value is corrected in accordance with conditions at the time of acquiring the evaluation value (for example, imaging sensitivity of the image sensor, cut-off frequency of an HPF applied to an image signal when evaluation value is calculated, brightness level based on the image signal, or imaging drive mode of the image sensor etc.) (refer to S3 in FIG. 2 and S19 in FIG. 3). Also, position of the focus lens where this evaluation value exhibits an extreme value is detected based on an evaluation value that has been corrected (refer to S5 and S7 in FIG. 2). Also, when it is determined that a corrected evaluation value is smaller than a specified threshold value, a determination threshold value for detecting a focus position at which the corrected evaluation value exhibits an extreme value is made stricter than when it is determined that the corrected evaluation value is greater than or equal to the specified threshold value (refer to S47, S49, and S55 in FIG. 6, and S65, S67, and S73 in FIG. 7). At tail portions of the AF evaluation value curve a determination threshold value for detecting a focus position is stricter, which means that it is possible to prevent erroneous determination of a peak of AF evaluation value that has been affected by noise.

It should be noted that in both the direction determination processing of FIG. 6 and the peak detection processing of FIG. 7 determination using low contrast threshold value and the accompanying processing are performed (refer to S47 in FIG. 6 and S65 in FIG. 7). However, it is possible to perform determination using low contrast threshold value for only one of either flow. This also applies to the second embodiment, which will be described later. Also, with an endoscope, as an imaging device, there are cases where contrast AF is performed with an AF evaluation value that was generated based on a particular color component (for example, only R, or G or B, or infrared light). Signal strength for a particular color component is handled similarly to brightness level, and AF evaluation value may be corrected using a correction value data stored in advance in accordance with signal strength for the particular color component. In the case of performing contrast AF based on a particular, component also, it is similarly possible to prevent erroneous determination that an AF evaluation value for a tail portion that has been affected by noise is a peak position (in-focus position), and to prevent erroneous direction determination.

Next, a second embodiment of the present invention will be described using FIG. 11 to FIG. 14. With the first embodiment, a difference value was subtracted from AF evaluation value, as shown in FIG. 9 and FIG. 10, and tail levels of the AF evaluation value curve were made substantially the same for high sensitivity and low sensitivity (refer to S19 in FIG. 3). Conversely, with the second embodiment, correction such as subtraction processing is not performed for high sensitivity and low sensitivity AF evaluation value curves, and instead, erroneous determination of an AF evaluation value peak is avoided by correcting the low contrast threshold value.

The structure of the second embodiment is the same as in the block diagram of FIG. 1 for the first embodiment, and so detailed description has been omitted. Also, flowcharts that show operations are the same as for the first embodiment, except that FIG. 2 for the first embodiment is replaced with FIG. 11, FIG. 3 is omitted, and FIG. 12 is added. Also, the graphs shown in FIG. 9 and FIG. 10 are replaced with FIG. 13 and FIG. 14.

It should be noted that the camera side CPU 107 of the second embodiment functions as a focus detection section that, based on an evaluation value that has been corrected by the evaluation value calculation section, detects position of a focus lens at which this evaluation value exhibits an extreme value (refer, for example to S5 and S7 in FIG. 11). The camera side CPU 107 functions as a correction section that corrects a threshold value in accordance with conditions at the time of acquisition of the evaluation value (refer, for example, to S20 in FIG. 12). The above described conditions are imaging sensitivity of the image sensor, cut-off frequency of a HPF that is applied to an imaging signal in an evaluation value calculation section, brightness level based on the imaging signal, or imaging drive mode of the image sensor. The above mentioned focus detection section, when it is determined that the evaluation value is smaller than a threshold value that has been corrected by the correction section, makes a determination threshold value for detecting a focus position at which the evaluation value exhibits on extreme value stricter than when it is determined that the evaluation value is greater than or equal to the threshold value that has been corrected (refer, for example, to S47 and S49 in FIG. 6, and S65 and S67 in FIG. 7).

The above described correction section selects or processes the correction value for threshold value that has been read out from the memory (storage section), in accordance with the imaging sensitivity, HPF cut-off frequency, brightness level, and/or imaging drive mode, and subtracts the correction value for threshold value that has been selected or processed from the threshold value (refer, for example, to S20 in FIG. 12). This correction section processes the correction value for threshold value in accordance with all of the imaging sensitivity, HPF cut-off frequency, brightness level, and imaging drive mode, or in accordance with a combination of these values (refer to S15 in FIG. 12).

Next, AF control operation of the camera of the second embodiment will be described using the flowchart shown in FIG. 11. This AF control operation is the same as that in the flowchart of FIG. 2 for the first embodiment, except that step S3 in FIG. 2 is replaced by step S4. Description will therefore concentrate on this point of difference.

If the flow for AF control shown in FIG. 11 is commenced, an AF evaluation value AFval is acquired (S1). Next, correction processing is performed on a low contrast threshold value (S4). Here, the camera side CPU 107 performs correction on the low contrast threshold value that was shown in FIG. 15 (refer to S47 in FIG. 6 and S65 in FIG. 7). Specifically, in the case of a high sensitivity AF evaluation value curve level of the low contrast threshold value is made high, while in the case of a low sensitivity AF evaluation value curve level of the low contrast threshold value is made low (refer to FIG. 14). Detailed operation of this correction processing for the low contrast threshold value will be described later using FIG. 12.

If low contrast threshold value correction processing has been performed in step S4, next, AF detection processing is performed (S5), in-focus position computation is performed (S7), and in-focus position drive is performed (S9). The processing in these steps is the same as for the case of FIG. 2, and so detailed description is omitted.

Next, detailed operation of the low contrast threshold value correction processing of step S4 will be described using the flowchart shown in FIG. 12.

The flow for low contrast threshold value correction processing shown in FIG. 12 is the same as that in FIG. 3 except that step S19 for the tail AF evaluation value stabilization processing that was shown in FIG. 3 is replaced by step S20. Description will therefore concentrate on points of difference.

If the flow shown in FIG. 12 is commenced, condition data is gathered (S11), exemplary data is gathered from a difference value table (S13), linear interpolation values for difference value are calculated (S15), and region area scaling processing for difference value is performed (S17). It should be noted that the difference value table has the same structure as that in FIG. 8, but as low contrast threshold value correction data (numerical values) may be made different to those of a first practical example.

If the area scaling processing has been performed in step S17, next, low contrast threshold value correction is performed (S20). This low contrast threshold value correction is correction of low contrast threshold value in accordance with level of the AF evaluation value curve, in order to prevent erroneous determination of a peak in tails of the AF evaluation value curve, in cases where levels of the AF evaluation value curve all become high, or all become low.

Low contrast threshold value is corrected in accordance with equation (6) below.

$$LowconTH=LowconTh+AFvalDeltaScale \qquad (6)$$

Here, LowconTh is low contrast threshold value, and AFvalDeltaScale is a difference value after region area scaling processing. This correction will be described later using FIG. 13 and FIG. 14.

If low contrast threshold value has been performed in step S20, the flow shown in FIG. 12 is terminated and the originating flow is returned to. If the originating flow is returned to, then in the AF detection processing of step S5 determination is performed using the low contrast threshold value that was corrected in step S20 (refer to S47 in FIG. 6 and S65 in FIG. 7), and focus adjustment of the focus lens is performed.

Figure 13:
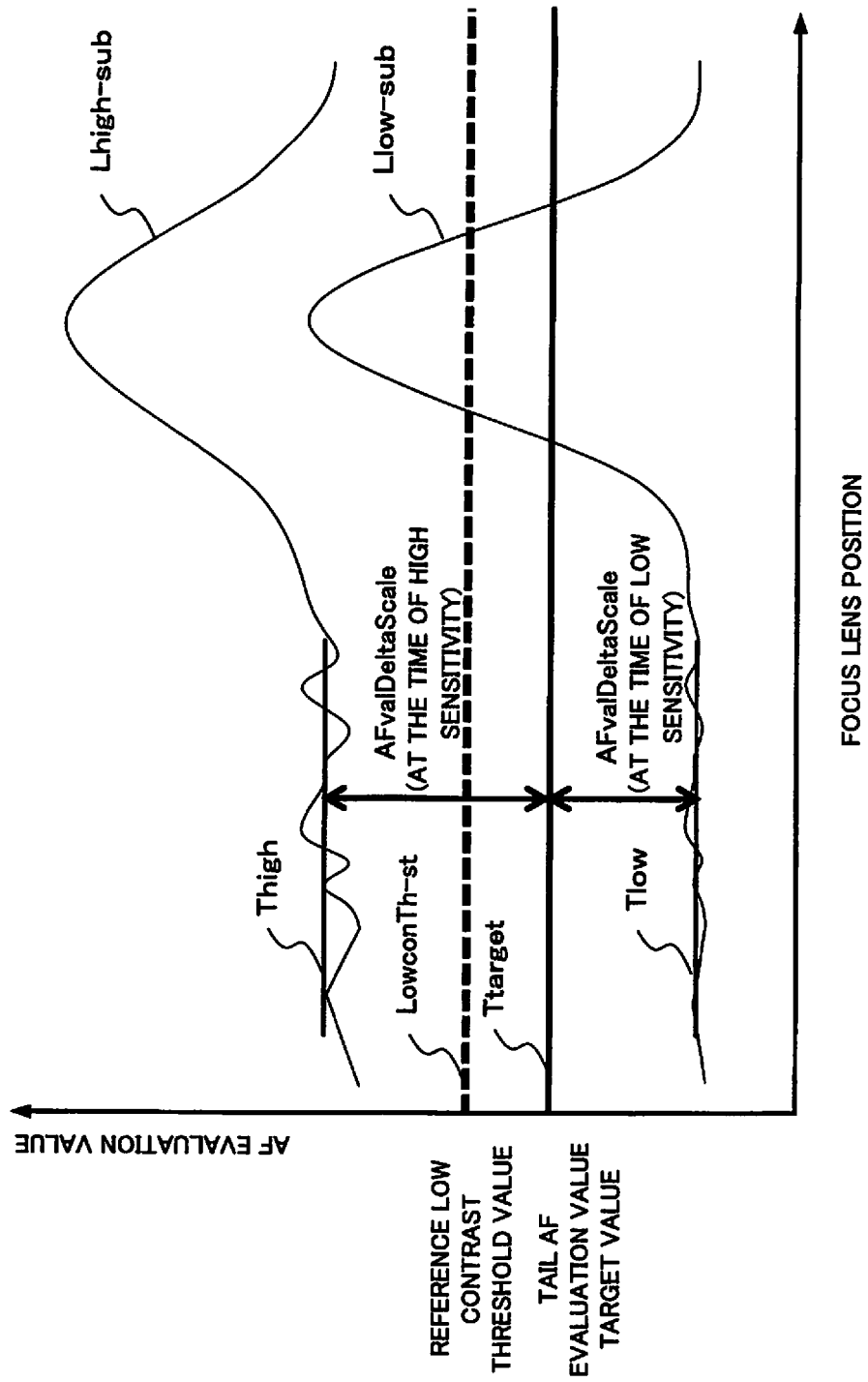
FIG. 13 is a graph showing tail AF evaluation value target values and difference values of contrast curves, in an AF control operation of the camera of the second embodiment of the present invention.

Next, correction processing for the low contrast threshold value will be described using FIG. 13 and FIG. 14. FIG. 13 is a drawing for describing difference values for tail AF evaluation value target values and tails of the AF evaluation value curve, similarly to FIG. 9. In FIG. 13, the horizontal axis represents position of the focus lens, and the vertical axis represents AF evaluation value for each position. Curve Lhigh-sub represents an AF evaluation value curve at the time of high sensitivity, while curve Llow-sub represents an AF evaluation value curve at the time of low sensitivity. A tail AF evaluation value target value Ttarget is a target value for tail levels of the AF evaluation value curve. Tails of the high-sensitivity AF evaluation value curve Lhigh-sub are at level Thigh, while tails of the low-sensitivity AF evaluation value curve Llow-sub are at level Tlow. A difference between the tail level Thigh and the tail AF evaluation value target value Ttarget is sensitivity difference value AFvalDeltaScale (for high sensitivity) at the time of high sensitivity. Also, a difference between the tail level Tlow and the tail AF evaluation value target value Ttarget is a sensitivity difference value AFvalDeltaScale (for low sensitivity) at the time of low sensitivity. Also, reference low contrast threshold value LowconTh-st may be the same as the low contrast threshold value LowconTh that was shown in FIG. 10.

Tail AF evaluation value target value Ttarget and levels Tlow and Thigh of tails of the AF evaluation value curve are the same as for the case of the first embodiment, and these difference values AFvalDeltaScale (for low sensitivity) and AFvalDeltaScale (for high sensitivity) are calculated in step S17 of FIG. 12 in the second embodiment also.

Figure 14:
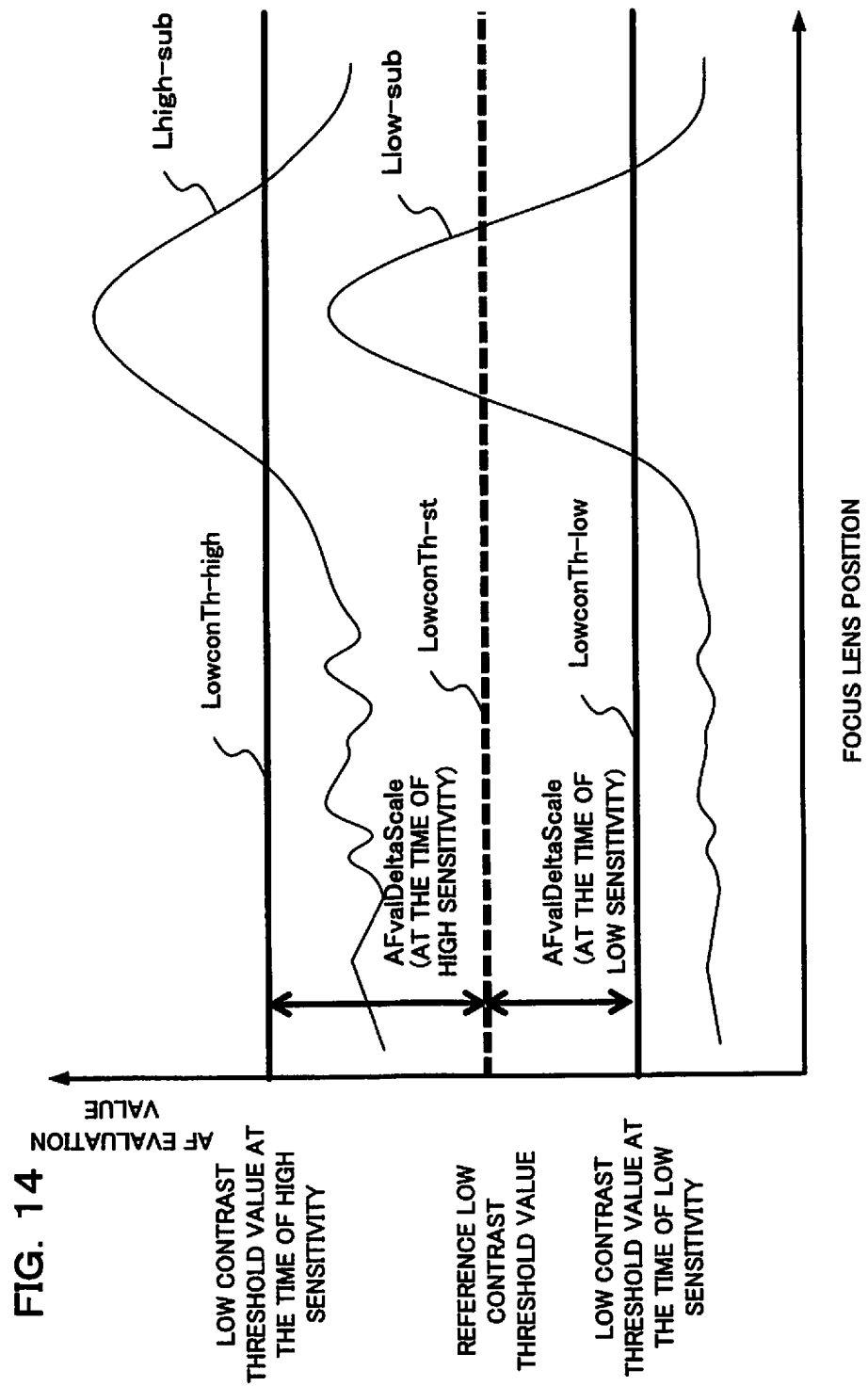
FIG. 14 is a graph showing a relationship between AF evaluation value and low contrast threshold value, in an AF control operation of the camera of the second embodiment of the present invention.
Figure 15:
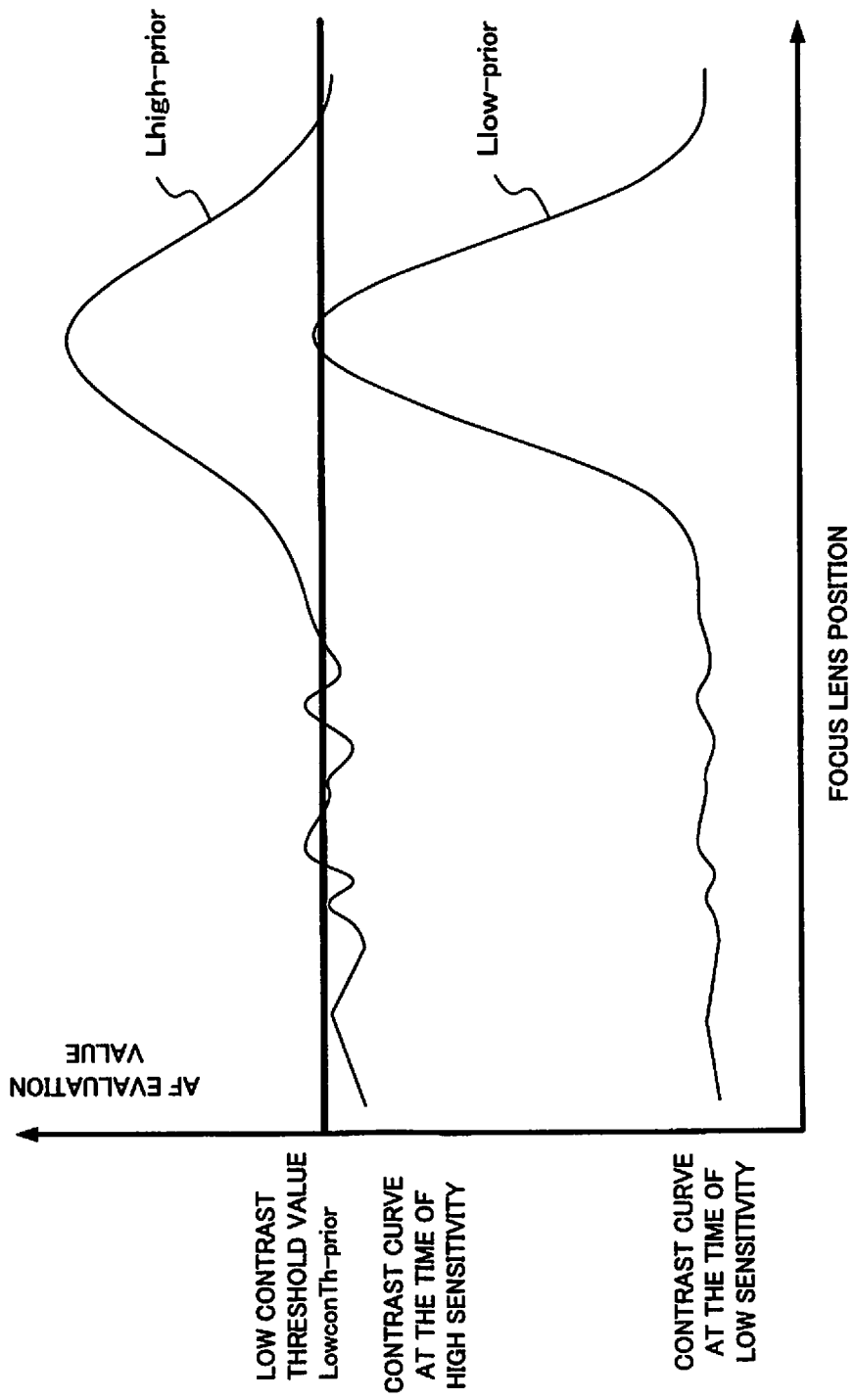
FIG. 15 is a graph showing a relationship between AF evaluation value and low contrast threshold value, in a conventional focus adjustment device.

FIG. 14 is a drawing for describing correction of the low contrast threshold value. With the first embodiment, as was described previously, by adding difference values to the AF evaluation value, curve tails of the AF evaluation value curve become substantially the same level. Conversely, with the second embodiment difference values are not added to the AF evaluation value curve, and difference values are added to the reference low contrast threshold value LowconTh-st. Specifically, a low contrast threshold value that is used for a high sensitivity AF evaluation value curve Lhigh-sub is made LowconTh-high by adding a difference value AFvalDeltaScale (for high sensitivity) to a reference low contrast threshold value LowconTh-st. Similarly, a low contrast threshold value that is used for a low sensitivity AF evaluation value curve Llow-sub is made LowconThlow by adding a difference value AFvalDeltaScale (for low sensitivity) to a reference low contrast threshold value LowconTh-st. It should be noted that in the case of low sensitivity difference values are negative values.

As described previously, with contrast AF an AF evaluation value curve for focus has a ridge shape. in order to prevent false focus at tails of the AF evaluation value curve a low contrast threshold value (absolute value) is set for AF evaluation value, and if the AF evaluation value falls below this threshold value a threshold value for peak/direction determination is made stricter. In the first embodiment, a single low contrast threshold value was set. Conversely, with the second embodiment values of the low contrast threshold value are made different depending on condition data such as imaging sensitivity. Specifically, in a case where level of the AF evaluation values become high, due to condition data such as imaging sensitivity, a difference value is added to a reference low contrast value, so that the low contrast threshold value becomes high. On the other hand, in a case where level of the AF evaluation values become low, due to condition data such as imaging sensitivity, a negative difference value is added, so that the low contrast threshold value becomes low. As a result, low contrast threshold value of an appropriate level is set regardless of conditions such as imaging sensitivity, and it is possible to prevent determination of erroneous noise etc. as a peak, and to prevent erroneous ranging.

In this way, with the second embodiment of the present invention, an image signal is output by subjecting subject light that is passed through a photographing optical system to photoelectric conversion using an image sensor, and an evaluation value that represents contrast is calculated based on the image signal (refer to S1 in FIG. 11). Also, position of the focus lens where this evaluation value exhibits an extreme value is detected based on an evaluation value that has been calculated (refer to S5 and S7 in FIG. 11). Also, threshold value is corrected in accordance with condition data at the time of acquiring an evaluation value (for example, imaging sensitivity of the image sensor, cut-off frequency of an HPF applied to an image signal, brightness level based on the image signal, or imaging drive mode of the image sensor etc.) (refer to S20 in FIG. 12). When it is determined that an evaluation value is smaller than a corrected threshold value, a determination threshold value for detecting a focus position at which the evaluation value exhibits an extreme value is made stricter than when it is determined that the evaluation value is greater than or equal to the corrected threshold value (refer to S47, S49, and S55 in FIG. 6, and S65, S67, and S73 in FIG. 7). Also, in a case of generating an AF evaluation value based on a specific color component (for example, only R, G or B, or infra-red) and performing contrast AF, signal strength of the specific color component is handled similarly to brightness level, and low contrast threshold value may be corrected using a correction value that has been stored in memory in accordance with signal strength of the specific color component. In the case of performing contrast AF based on a particular, component also, it is similarly possible to prevent erroneous determination that an AF evaluation value for a tail portion that has been affected by noise is a peak position (in-focus position), and to prevent erroneous direction determination.

As has been described above, with each of the embodiments of the present invention, a difference value for correcting levels of tail portions of an evaluation value curve to a fixed level is calculated, and evaluation value or threshold value are corrected using this difference value (refer, for example, to S19 in FIG. 3, and S20 in FIG. 12). Also, position of the focus lens where this evaluation value exhibits an extreme value is detected based on an evaluation value that has been calculated (refer, for example, to S5 and S7 in FIG. 2 and FIG. 11). Also, position of the focus lens is detected in a state where a relative positional relationship between levels of tail portions of the evaluation value curve, and threshold values, has become fixed, using the evaluation value or threshold value that has been corrected (refer to FIG. 10 and FIG. 14). As a result, it is possible to move a focus lens to a correct in-focus position, at the time of focus adjustment using AF evaluation value, even if there is change in condition data, such as imaging sensitivity, HPF cut-off frequency, brightness level, imaging drive mode etc.

As was described previously, with contrast AF an AF evaluation value curve for focus has a ridge shape. With conventional contrast AF, in order to prevent false focus at tails of an AF evaluation value curve a low contrast threshold value (absolute value) is set for an AF evaluation value, and if the AF evaluation value becomes lower than the low contrast threshold value it is determined that detection is not possible. However, at tail regions of the AF evaluation value curve an absolute value of AF evaluation value fluctuates due to condition data such as imaging sensitivity, HPF cut-off frequency, brightness level etc., and so false focus arose if determination as to whether detection is possible was performed using a single low contrast threshold value. In actual fact there is a problem of false focus arising where it has been determined that detection is possible even in a focus not possible state. Conversely, low contrast is determined even in conditions having sufficient contrast, and there were cases where the user had a feeling of discomfort. By contrast, with each of the embodiments of the present invention level of an AF evaluation value curve is corrected in accordance with condition data (refer to the first embodiment), or a low contrast threshold value is corrected. This means that it is possible to prevent false focus, even in cases where AF evaluation value has fluctuated due to condition data. Also, in the event that AF evaluation value falls below the low contrast threshold value, focus not possible does not arise in the same way, but a threshold value for peak/direction determination is made stricter, which means that it is possible to improve detection capability for a subject of medium to low contrast.

It should be noted that in each of the embodiments of the present invention focus adjustment of a focus lens has only been performed using contrast AF. However, this is not limiting and it is also possible to combine with phase difference AF. Also, with each of the embodiments of the present invention, the AF evaluation value calculation circuit 108, AE evaluation value calculation circuit 109 and image processing circuit 110 have been provided separately to the camera side CPU 107. However, this is not limiting and some or all of these circuits may be incorporated into peripheral circuitry of the camera side CPU 107. Also, instead of these hardware circuits, the present invention may also be constructed in the form of software using a CPU and programs, or may be constructed in hardware such as gate circuitry generated based on a programming language described using Verilog, or may be constructed using a DSP (digital signal processor). Suitable combinations of these approaches may also be used. The use of a CPU is also not limiting as long as elements fulfill a function as a controller.

Also, the CPU within the camera side CPU 107 may be an element that fulfills a function as a controller. Processing of each of the above described circuits may also be performed by a single processor that is configured as hardware. For example, each section may be a processor constructed as respective electronic circuits, and may be respective circuits sections of a processor that is constructed with an integrated circuit such as an FPGA (Field Programmable Gate Array). Alternatively, a processor that is constructed with one or more CPUs may execute functions of each section, by reading out and executing computer programs that have been stored in a storage medium.

Also, with this embodiment, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone, a mobile information terminal, personal computer (PC), tablet type computer, game console etc., a medical camera, or a camera for a scientific instrument such as a microscope, a camera for mounting on a vehicle, a surveillance camera etc. In any event, it is possible to adopt the present invention as long as a device for taking pictures carries out automatic focus adjustment using contrast AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device, comprising:
an image sensor that subjects subject light that has passed through a photographing optical system to photoelectric conversion and outputs an image signal; and
a processor that comprises an evaluation value calculation section, a correction section and a focus detection section, wherein
the evaluation value calculation section calculates an evaluation value that represents contrast, based on the image signal output by the image sensor,
the correction section corrects the evaluation value or a specified threshold value in accordance with conditions at the time of acquiring the evaluation value,
the focus detection section detects position of a focus lens at which the evaluation value exhibits an extreme value, based on the evaluation value that has been calculated by the evaluation value calculation section or an evaluation value that has been corrected by the correction section,
and wherein
the focus detection section, if, at the time of correction of the evaluation value by the correction section, it is determined that the corrected evaluation value is smaller than the specified threshold value, makes a determination threshold value for detection of a focus position at which the corrected evaluation value exhibits an extreme value, stricter than for a case when it is determined that the corrected evaluation value is greater than the specified threshold value, or
the focus detection section, if, at the time of correction of the specified threshold value by the correction section, it is determined that the evaluation value is smaller than threshold value that has been corrected by the correction section, makes a determination threshold value for detection of a focus position at which the evaluation value exhibits an extreme value, stricter than for a case when it is determined that the evaluation value is greater than the corrected threshold value.

2. The focus adjustment device of claim 1, wherein:
the conditions are imaging sensitivity of the image sensor, cut-off frequency of a HPF that is applied to an imaging signal in the evaluation value calculation section, brightness level based on the imaging signal, or imaging drive mode of the image sensor.

3. The focus adjustment device of claim 2, further comprising:
a memory that stores correction values based on the imaging sensitivity, HPF cut-off frequency, brightness level, and imaging drive mode, wherein
the correction section selects or processes the correction value that has been read out from the memory, in accordance with the imaging sensitivity, HPF cut-off frequency, brightness level, and/or imaging drive mode, and subtracts the correction value that has been selected or processed from the evaluation value.

4. The focus adjustment device of claim 3, wherein:
the correction section processes the correction value in accordance with all or a combination of the imaging sensitivity, HPF cut-off frequency, brightness level, and imaging drive mode.

5. The focus adjustment device of claim 1, wherein:
the correction section calculates a difference value for correcting level at tail portions of the evaluation value curve to a fixed level, and corrects the evaluation value or the threshold value using the difference value; and
the focus detection section detects position of the focus lens, in a state where a relative positional relationship between levels of tail portions of the evaluation value curve, and the threshold values, has become fixed, using the evaluation value or threshold value that has been corrected by the correction section.

6. The focus adjustment device of claim 5, wherein:
the correction section gathers condition data that affects levels at tail portions of the evaluation value curve, and obtains the difference value based on this condition data.

7. The focus adjustment device of claim 6, wherein:
the condition data are imaging sensitivity of the image sensor, cut-off frequency of a HPF that is applied to an imaging signal in the evaluation value calculation section, brightness level based on the imaging signal, or imaging drive mode of the image sensor.

8. A focus adjustment method, comprising:
subjecting subject light that has passed through a photographing optical system to photoelectric conversion using an image sensor, and outputting an image signal;
calculating an evaluation value that represents contrast based on the image signal;
correcting the evaluation value or a specified threshold value in accordance with conditions at the time of acquiring the evaluation value;
detecting position of the focus lens where the evaluation value exhibits an extreme value based on the evaluation value or the corrected evaluation value,
if, at the time of correction of the evaluation value, it is determined that the corrected evaluation value is smaller than the specified threshold value, making a determination threshold value for detection of a focus position at which the corrected evaluation value exhibits an extreme value, stricter than for a case when it is determined that the corrected evaluation value is greater than the specified threshold value, or
if, at the time of correction of the specified threshold value, it is determined that the evaluation value is smaller than the corrected threshold value, makes a determination threshold value for detection of a focus position at which the evaluation value exhibits an extreme value, stricter than for a case when it is determined that the evaluation value is greater than the corrected threshold value.

9. The focus adjustment method of claim 8, wherein:
the conditions are imaging sensitivity of the image sensor, cut-off frequency of a HPF that is applied to an imaging signal, brightness level based on the imaging signal, or imaging drive mode of the image sensor.

10. The focus adjustment method of claim 9, further comprising:
storing correction values based on the imaging sensitivity, HPF cut-off frequency, brightness level, and imaging drive mode, in memory; and
selecting or processing the correction value that has been read out from the memory, in accordance with the imaging sensitivity, HPG cut-off frequency, brightness level, and/or imaging drive mode, and subtracting the correction value that has been selected or processed from the evaluation value.

11. The focus adjustment method of claim 10, further comprising:
processing the correction value in accordance with all of the imaging sensitivity, HPF cut-off frequency, brightness level, and imaging drive mode, or in accordance with a combination of these values.

12. The focus adjustment method of claim 8, further comprising:

calculating a difference value for correcting levels at tail portions of the evaluation value curve to a fixed level, correcting the evaluation value or threshold value using the difference value, and detecting position of a focus lens, in a state where a relative positional relationship between levels at tail portions of the evaluation value curve, and the threshold value, has become fixed, using the evaluation value or the threshold value that has been corrected.

13. The focus adjustment method of claim 12, further comprising:

gathering condition data that affects levels at tail portions of the evaluation value curve, and obtaining the difference value based on this condition data.

14. The focus adjustment method of claim 13, wherein:

the condition data are imaging sensitivity of the image sensor, cut-off frequency of a HPF that is applied to an imaging signal in the evaluation value calculation section, brightness level based on the imaging signal, or imaging drive mode of the image sensor.

15. A non-transitory computer-readable medium storing a processor executable code, which when executed by at least one processor, performs a focus adjustment method, the focus adjustment method comprising:

subjecting subject light that has passed through a photographing optical system to photoelectric conversion using an image sensor, and outputting an image signal;

calculating an evaluation value that represents contrast based on the image signal;

correcting the evaluation value or a specified threshold value in accordance with conditions at the time of acquiring the evaluation value;

detecting position of the focus lens where the evaluation value exhibits an extreme value based on the evaluation value or the corrected evaluation value, if, at the time of correction of the evaluation value, it is determined that the corrected evaluation value is smaller than the specified threshold value, making a determination threshold value for detection of a focus position at which the corrected evaluation value exhibits an extreme value, stricter than for a case when it is determined that the corrected evaluation value is greater than the specified threshold value, or if, at the time of correction of the specified threshold value, it is determined that the evaluation value is smaller than the corrected threshold value, makes a determination threshold value for detection of a focus position at which the evaluation value exhibits an extreme value, stricter than for a case when it is determined that the evaluation value is greater than the corrected threshold value.

16. The non-transitory computer-readable medium of claim 15, storing further processor executable code, which when executed by the at least one processor, causes the at least one processor to perform a method, wherein:

the conditions are imaging sensitivity of the image sensor, cut-off frequency of a HPF that is applied to an imaging signal, brightness level based on the imaging signal, or imaging drive mode of the image sensor.

17. The non-transitory computer-readable medium of claim 16, storing further processor executable code, which when executed by the at least one processor, causes the at least one processor to perform a method further comprising:

storing correction values based on the imaging sensitivity, HPF cut-off frequency, brightness level, and imaging drive mode, in memory; and selecting or processing the correction value that has been read out from the memory, in accordance with the imaging sensitivity, HPG cut-off frequency, brightness level, and/or imaging drive mode, and subtracting the correction value that has been selected or processed from the evaluation value.

18. The non-transitory computer-readable medium of claim 17, storing further processor executable code, which when executed by the at least one processor, causes the at least one processor to perform a method further comprising:

processing the correction value in accordance with all of the imaging sensitivity, HPF cut-off frequency, brightness level, and imaging drive mode, or in accordance with a combination of these values.

19. The non-transitory computer-readable medium of claim 15, storing further processor executable code, which when executed by the at least one processor, causes the at least one processor to perform a method further comprising:

calculating a difference value for correcting levels at tail portions of the evaluation value curve to a fixed level, correcting the evaluation value or threshold value using the difference value, and detecting position of a focus lens, in a state where a relative positional relationship between levels at tail portions of the evaluation value curve, and the threshold value, has become fixed, using the evaluation value or the threshold value that has been corrected.

20. The non-transitory computer-readable medium of claim 19, storing further processor executable code, which when executed by the at least one processor, causes the at least one processor to perform a method further comprising:

gathering condition data that affects levels at tail portions of the evaluation value curve, and obtaining the difference value based on this condition data.

\* \* \* \* \*